US008056765B2

(12) United States Patent
Auerbach et al.

(10) Patent No.: US 8,056,765 B2
(45) Date of Patent: Nov. 15, 2011

(54) DISCHARGE DEVICE FOR MEDIA

(75) Inventors: Judith Auerbach, Radolfzell (DE); Juergen Greiner-Perth, Gottmadingen (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 819 days.

(21) Appl. No.: 12/079,355

(22) Filed: Mar. 26, 2008

(65) Prior Publication Data

US 2008/0237264 A1 Oct. 2, 2008

(30) Foreign Application Priority Data

Mar. 26, 2007 (DE) ........................ 10 2007 016 503

(51) Int. Cl.
*G01F 11/00* (2006.01)

(52) U.S. Cl. .................. 222/162; 222/309; 222/153.13; 222/321.8

(58) Field of Classification Search .................. 222/162, 222/182, 183, 153.13, 384, 321.8, 321.2, 222/383.1, 321.7–321.9, 309
See application file for complete search history.

(56) References Cited

U.S. PATENT DOCUMENTS 3,157,317 A 11/1964 Ramsbotham
4,098,436 A 7/1978 Kohlbeck
4,771,769 A * 9/1988 Hegemann et al. ...... 128/200.22
5,169,029 A 12/1992 Behar et al.
6,045,008 A 4/2000 Gonzalez Fernandez et al.
6,305,580 B1 * 10/2001 Chen ............................ 222/162
6,338,422 B1 1/2002 DeJonge
6,419,124 B1 7/2002 Hennemann et al.
6,510,847 B1 1/2003 Helgesson et al.
6,527,144 B2 * 3/2003 Ritsche et al. ................ 222/162
6,871,798 B2 3/2005 Mathiez
7,717,299 B2 * 5/2010 Greiner-Perth ............... 222/162
7,798,368 B2 * 9/2010 Anderson et al. ............. 222/162
2004/0011819 A1 1/2004 Jennings et al.
2005/0258191 A1 * 11/2005 Davies .......................... 222/162
2006/0016833 A1 1/2006 Greiner-Perth (Continued)

FOREIGN PATENT DOCUMENTS

DE 1 801 838 6/1970

(Continued)

OTHER PUBLICATIONS

Office Action from Germany Patent Office dated Jan. 24, 2008 (7 pages).

(Continued)

*Primary Examiner* — Kevin P Shaver
*Assistant Examiner* — Donnell Long
(74) *Attorney, Agent, or Firm* — Flynn, Thiel, Boutell & Tanis, P.C.

(57) ABSTRACT

A discharge device for media includes an outer housing with a discharge opening, a discharge handle for manual actuation. A support is arranged in the outer housing. Movable along a main axis relative to the outer housing and connected to the discharge handle, it has a seat for a pump dispenser. A pump is actuated by compression of the pump dispenser. A first abutment on the housing interacts with the pump dispenser, actuating the pump.
The support has a functional portion which acts on the pump dispenser with a force oriented in the direction of the first abutment on the housing. An adjuster is provided between the handle and the functional portion of the support, by which the position of the functional portion relative to the first abutment on the housing can be adjusted for a defined setting of the discharge handle.

27 Claims, 12 Drawing Sheets

U.S. PATENT DOCUMENTS

| | | | | |
|---|---|---|---|---|
| 2006/0151536 | A1 | 7/2006 | Wong et al. | |
| 2007/0131717 | A1* | 6/2007 | Davies et al. | 222/162 |
| 2007/0164049 | A1 | 7/2007 | Bonney et al. | |
| 2008/0116223 | A1* | 5/2008 | Stradella | 222/162 |

FOREIGN PATENT DOCUMENTS

| | | | |
|---|---|---|---|
| DE | 196 10 456 | A1 | 9/1997 |
| DE | 202 12 898 | U1 | 2/2003 |
| DE | 699 14 204 | T2 | 2/2005 |
| EP | 0 953 381 | A | 11/1999 |
| EP | 1 197 266 | A2 | 4/2002 |
| EP | 1 616 629 | A | 1/2006 |
| WO | WO 98/30469 | A | 7/1998 |
| WO | WO 01/03851 | A | 1/2001 |
| WO | WO 01/03851 | A1 | 1/2001 |
| WO | WO 02/30504 | A | 4/2002 |
| WO | WO 2004/056413 | A | 7/2004 |
| WO | WO 2005/075100 | | 8/2005 |
| WO | WO 2005/087615 | A1 | 9/2005 |
| WO | WO 2006/109021 | A | 10/2006 |

OTHER PUBLICATIONS

European Patent Office Search Report (EP08005604.7) dated Jul. 14, 2008 (10 pages).

European Patent Office Search Report (EP08005666.6) dated Jul. 14, 2008 (6 pages).

European Patent Office Search Report (EP08005667.4) dated Jul. 29, 2008 (7 pages).

* cited by examiner

DISCHARGE DEVICE FOR MEDIA

FIELD OF APPLICATION AND PRIOR ART

The invention relates to a discharge device for media, with an outer housing with a discharge opening, a discharge handle for manual actuation of the discharge device, a support which is arranged in the outer housing, is movable along a main axis relative to the outer housing, is operatively connected axially to the discharge handle and has a seat for a pump dispenser, which comprises a pump that can be actuated by compression of the pump dispenser along the main axis, and a first abutment which is provided on the housing and which is intended for interaction with the pump dispenser for the purpose of actuating the pump.

A discharge device of the type in question is known from EP 1197266 B1, for example. The spray device disclosed therein comprises a cylindrical housing in which a pump dispenser is arranged. This pump dispenser comprises a media reservoir and a pump that can be activated by axial compression of the pump dispenser. This axial compression is achieved indirectly via a handle, which is connected in one piece to a support. When this handle is actuated, the pump dispenser in its entirety is pressed against an abutment on the housing, as a result of which the pump is compressed and the medium is thus conveyed out of the pump dispenser and is then conveyed onward to a discharge opening of the spray device and expelled from the latter.

The discharge devices known in the prior art are considered to be in need of improvement in many respects. On account of manufacturing tolerances concerning the abutment on the housing and concerning the pump provided in the pump dispenser, there is a considerable variation in the actuation range in which the discharge handle has to be moved for actuation in order to bring about a discharge procedure. This can have the result that a complete pump stroke cannot be achieved via the discharge handle, or that an actuation beyond the end of the pump stroke is possible. Another disadvantage is considered to be that the discharge handle in the unactuated state protrudes far from the housing of the discharge device, such that the packing volume of such a discharge device is relatively large and there is a danger of medium accidentally being expelled during transportation of the discharge device. A further disadvantage is considered to be that such discharge devices generally have to be assembled by being plugged together coaxially in a main direction of extent of the discharge device, which leads to constructional limitations, for example because undercuts have to be avoided. A further disadvantage is considered to be the usual arrangement of the discharge handle in the prior art, in which an actuation of the discharge handle by means of the thumb of one hand is not possible in an ergonomic way, because of the mutually opposite pivot axes of the thumb and of the handle.

OBJECT AND SOLUTION

The object of the invention is to develop a discharge device of the type in question and to develop an assembly method of the type in question for a discharge device, in order to avoid the disadvantages of the prior art.

According to the invention, this is achieved by a discharge device of the type in question in which the support has at least one functional portion which, during a discharge procedure, acts on the pump dispenser with a force oriented in the direction of the first abutment on the housing, and in which an adjusting means is provided between the discharge handle and the functional portion of the support, by which means the position of the functional portion relative to the first abutment on the housing can be adjusted for a defined setting of the discharge handle.

A discharge device with the features of the type in question is able to receive a pump dispenser that comprises a media reservoir and a pump fitted on the media reservoir. This pump dispenser can be displaced inside the housing by actuation of the discharge handle, an actuation portion of the pump dispenser, normally identical to a discharge tube of the pump dispenser, being moved relative to the other components of the pump dispenser in the direction of the main axis, which results in an actuation of the pump and a discharge device. The discharged medium is discharged through a discharge opening provided in the outer housing. The discharge opening does not have to be directly part of the outer housing, but can also be provided in an outlet component group that is connected securely to the housing. The pump dispenser is preferably designed as a separate unit, but it can also be an integral part of the discharge device. In such a case, it is not absolutely necessary for the pump of the pump dispenser and the media reservoir to be connected securely to each other. Instead, the media reservoir can also assume a fixed position in the housing, while only the pump is moved by the support during a discharge procedure.

By virtue of the inventive embodiment with an adjusting means, via which the functional portion of the support (which for the purpose of movement on the pump dispenser exerts a force acting in the direction of the first abutment on the housing) can be adjusted in terms of its relative position with respect to the discharge handle, it is possible to adjust the position in which the pump dispenser is located in a defined setting of the discharge handle. It is in this way possible to compensate for tolerances which, for example, have a bearing on the position of the abutment relative to the housing, on the effective pump stroke relative from the pump dispenser, and on an outlet tube of the pump dispenser and its length. This ensures that, despite the stated manufacturing tolerances and other manufacturing tolerances concerning the individual components, a discharge procedure always begins at the same setting of the discharge handle and/or always ends at the same setting of the discharge handle. It is thus possible, in the movement profile of the discharge handle, to define an area in which the actuation of the discharge handle causes an actuation of the pump dispenser. In particular, it is possible to avoid a situation where an actuation of the discharge handle is not sufficient to carry out the complete pump stroke or can continue to be moved even after the complete pump stroke has been reached. In addition, the adjusting means permits the use of different types of pump dispensers, since, by an adjustment of the adjusting means, it is possible to influence the position of the functional portion relative to the first abutment on the housing upon actuation of the discharge handle.

The actual arrangement and design of the adjusting means is conceivable in many different designs. Particular preference is given to adjusting means which are provided between the handle and the support or, on a multi-part support, between support portions.

In one development of the invention, the support has at least two support portions, where a first support portion is forcibly guided by the discharge handle at least during an actuation of the discharge handle, a second support portion comprises the functional portion of the support, and the position of the support portions relative to each other can be adjusted with the aid of the adjusting means.

In a discharge device according to this development, the movement profile of the first support portion, as a function of the movement profile of the discharge handle, is always constant and cannot be adjusted by the adjusting means. This leads to the possibility of very simple designs of the operative connection between the actuation handle and the first support portion. Thus, in the simplest case, the first support portion can be connected in one piece to the discharge handle. Similarly, a particularly simple design can be achieved using a pivotable discharge handle, in which case a lever portion is integrally formed on the discharge handle and engages under a radially extending extension piece formed integrally on the support portion. The adjusting means is provided between the two support portions and is easy to construct. Here, a simple design is, for example, one in which the first and second support portions are configured as approximately cylindrical or beaker-shaped components, which are connected to each other by a thread. Thus, the adjusting means can be set by simply rotating the second support portion relative to the first support portion.

In one development of the invention, a second abutment is provided on the housing and is intended for interaction with the discharge handle or the first support portion.

Accordingly, this second abutment on the housing directly or indirectly determines how far the discharge handle can be actuated. Actuation beyond this is prevented by the second abutment on the housing. This second abutment on the housing permits a particularly advantageous setting of the adjusting means, since it allows the adjusting means to be set while the discharge handle and the first support portion bear on the second abutment on the housing. If, in this end position of the discharge handle or of the first support portion, the adjusting means is set such that the functional surface of the support is at such a distance from the first abutment on the housing that the pump dispenser is located in an actuated state, this ensures that, upon subsequent actuation, the effective pump stroke of the pump dispenser is concluded precisely when the discharge handle or the first support portion comes to bear on the second abutment on the housing. This effectively protects the pump against overloading, since the pump cannot be compressed beyond its intended pump stroke. Manual introduction of force into the discharge handle, beyond its end position defined by the second abutment on the housing, leads to this force being transmitted into the housing by means of the second abutment on the housing, without damaging the pump.

As regards the adjusting means, in one development of the invention the adjusting means can be adjusted axially in a stepless manner.

This stepless adjustability permits a particularly exact adaptation to the manufacturing and assembly tolerances that sometimes occur. A stepless adjustability can be achieved, for example, via a thread, preferably locked by means of a locking screw, or an interference fit for joining together two parts, in particular the two support portions.

Alternatively, the adjusting means can be adjusted axially in a stepped manner, the step sizes being preferably smaller than one millimeter, particularly preferably smaller than 0.6 mm, in particular smaller than 0.3 mm. The advantage of axially stepped adjusting means, preferably acting with a form fit, lies in the fact that, depending on the configuration, they provide a high degree of safety against an unwanted return movement.

The adjusting means are particularly preferably in the form of locking means which are designed for locked connections in a plurality of different locking positions, said locking positions differing from one another in terms of the axial position of the functional portion relative to the discharge handle or the first support portion. Such locking means are advantageous particularly in terms of their stability and simple assembly. They can easily be brought into their desired position by application of a defined assembly force.

It is preferable for the locking means to comprise several subsidiary locking means whose respective locking positions differ at least partially from one another. This affords the advantage of a particularly fine division and, consequently, particularly small step widths.

This can be achieved, for example, by locking means that comprise at least one locking ladder with locking steps and two locking lugs that lie opposite the at least one locking ladder and are designed to interact with the locking ladder. In relation to the direction of extent of the locking ladder, the locking lugs are arranged transverse to the locking steps and slightly offset with respect to one another, preferably offset by half the distance of the locking steps of the locking ladder. In an embodiment with a two-part support, the locking ladder can, for example, be designed circumferentially on an outer face of the second support portion, while the locking lugs are provided on an inner face of the first support portion surrounding the second support portion.

In one development of the invention, a spacer is fitted between the functional portion of the support and the pump dispenser. The use of such a spacer has the effect that a second functional portion is formed by the spacer, which assumes the function of the first functional portion in respect of introducing force into the pump dispenser. The spacer itself rests on the first functional portion. The use of such a spacer allows the same discharge device to be used with different pump dispensers, which can differ particularly in terms of the size of their media reservoir. It is true that this flexibility can also be achieved by suitable design of the adjusting means, but the use of spacers allows the adjusting means to be made much smaller, since they do not then serve primarily for adaptation to different pump dispenser sizes, but only for compensation of component tolerances.

In one development of the invention, the functional portion is arranged such that the force is introduced through the functional portion onto that side of the pump dispenser directed away from the first abutment on the housing.

In the case of a conventional pump dispenser, which consists of an approximately cylindrical bottle as media reservoir and of a cover with pump placed thereon, the functional portion of a discharge device according to this development would engage on the bottom of the bottle. The advantage of a design according to this development lies in particular in the fact that the pump dispenser is in each case compressed in its entirety by the actuation force, such that particular leaktightness is achieved. In such an embodiment, the adjusting means are of great advantage, because they also permit compensation of the tolerances in the pump dispenser between the bottom of the bottle and the pump system of the pump dispenser.

In a preferred development, the support or the first support portion, on a side directed toward the first abutment on the housing, has a preferably funnel-shaped centering aid and/or guide aid for connection to a discharge channel on the housing.

Such a design of the support is particularly advantageous in discharge devices in which the support is pushed into the housing in the direction of the main axis. In such a design, correct insertion of the support is important for ensuring connection of the discharge channel to the pump dispenser. In addition, such a centering aid can also serve as a guide aid, by defining the position of the support during the axial movement in operation.

The invention further relates to a discharge device of the type in question, in particular as a development of the discharge device explained above, in which development the discharge device can be switched between an activated operating state, in which an actuation of the discharge handle causes a translation of the support, and a deactivated operating state, in which an actuation of the discharge handle is blocked or the discharge handle is uncoupled from the support.

A switchable discharge device of this kind has advantages especially for the transportation of the discharge device. This applies both to individual transportation by the end user and also to mass transportation. In the activated operating state, the discharge device can be used in the normal way, such that an actuation of the discharge handle leads to a desired discharge procedure. For this purpose, there is an axial operative coupling between the discharge handle and the support in the activated state. In the deactivated operating state, an actuation of the discharge handle can be blocked. This means that the discharge handle cannot be moved from a rest position and, consequently, no accidental movement can take place. As an alternative to the blocking of the discharge handle, it is also possible for the discharge handle to be uncoupled from the support in the deactivated operating state. This uncoupling relates to the operative connection in the axial direction. Such uncoupling has the effect that, although the discharge handle can be moved, it has no influence on the position of the support within the housing. Once again, therefore, there is no danger of a discharge procedure taking place.

In one development of the invention, the discharge handle, in the deactivated operating state, is arranged in a space-saving stowage position. In this stowage position, the discharge handle preferably lies snugly on the housing of the discharge device. A space-saving stowage position facilitates transportation, which is of advantage both for individual transportation and also for mass transportation. In addition, in one advantageous embodiment, the discharge device has a protective cap, which is only to be fitted in place when the discharge handle is in its stowage position. This therefore reduces the risk of a user forgetting to transfer the discharge device to its deactivated operating state.

In one development of the invention, the discharge handle, in the activated state, cannot be moved into the stowage position. For this purpose, the axial operative coupling between the discharge handle and the support is designed such that, when this operative coupling is present, the discharge handle does not reach the stowage position both in the actuated and also in the unactuated active state. Such a design ensures that the discharge device is not accidentally transferred to the actuated active operating state, for example by movement in connection with transportation of the discharge device at the deactivated operating state. This unwanted transfer of the discharge device to the activated operating state would, on the one hand, have disadvantages during assembly, and, on the other hand, a transportation free from actuation and free from leakage would no longer be guaranteed.

In one development of the invention, the operating state can be controlled by a rotation movement of the support about the main axis, the axial operative connection between the support and the discharge handle being present in at least a first angle portion, and the axial operative connection between the support and the discharge handle being interrupted in at least a second angle portion. Accordingly, in this design, a relative rotation between the discharge handle and the support can be used in order to define the operating state. For this purpose, the support is preferably rotated relative to the housing with discharge handle. This solution represents a particularly simple way of controlling the operating state through a simple movement. For this purpose, the support has a different configuration in different angle portions relative to the main axis. Particularly advantageous configurations are ones in which the first and second angle portions together enclose an angle of not more than 90°, such that the operating state can be changed even by means of a comparatively small movement. In the first angle portion, there is an axial operative connection, such that an actuation of the discharge handle results in a translational movement of the support, which in turn leads to a discharge procedure via a movement of the pump dispenser. In the second angle portion, this axial operative connection between support and discharge handle is interrupted, this being achieved either by a complete uncoupling of the support from the discharge handle or by an uncoupling only with respect to the axial component.

Embodiments are particularly preferred in which, in a third angle portion, there is an axial blocked connection between the support and the discharge handle, by which the discharge handle is held in a blocked position. This blocked position preferably corresponds to the stowage position of the discharge handle. The configuration of the support, in respect of the third angle portion, ensures that the discharge handle remains in this stowage position in the deactivated operating state, such that the discharge device has an advantageously small extent, and this also avoids the discharge handle being freely movable and getting in the way in the uncoupled state.

In one development of the invention, the support has an operative connection portion for interaction with the discharge handle, the operative connection portion having at least one radially extending recess into which, in the activated operating state, there protrudes a guide extension connected to the discharge handle.

The guide extension is designed to be moved by the discharge handle, in the activated operating state, in the direction of the first abutment on the housing, in which process the operative connection portion of the support, and thus the support itself, is also moved together with the guide extension in the direction of the first abutment on the housing. In the simplest case, the recess is designed as a simple free space under a projection that extends radially from the support. In such a configuration, the operative coupling between the discharge handle and the support is such that the movement of the guide extension of the discharge handle, by means of force introduced into the projection, causes a corresponding movement of the support and an associated actuation of the pump, whereas there is no corresponding operative coupling in the opposite direction. In another configuration, the recess on the operative connection portion of the support is closed in both directions of the main axis, such that a bidirectional forcible coupling is present between the support and the guide extension of the discharge handle in the activated operating state.

In a particularly preferred embodiment of the discharge device, the operative connection portion has an at least partially cylindrical shape extending in the direction of the main axis, the recess being designed as a control cam that extends on a circumferential surface of the operative connection portion. By means of the control cam, each rotation position of the support in the unactuated state, and thus of its operative connection portion, is assigned a corresponding setting of the discharge handle. Rotating the support, and thus the operative connection portion, defines where on the control cam the guide extension of the discharge handle is located.

The control cam is preferably designed such that, in the first angle portion, it has a first control cam portion which extends on the outer surface of the operative connection portion in a plane orthogonal to the main axis and/or, in the second angle portion, a second control cam portion which extends on the outer surface of the operative connection portion axially with respect to the main axis and circumferentially with respect to the outer surface of the operative connection portion and/or, in the third angle portion, a third control cam portion which extends on the outer surface of the operative connection portion in a plane orthogonal to the main axis. When the guide extension is located in the first or the third angle portion, there is then a positive coupling between the discharge handle and the support. In the first angle portion, this positive coupling is such that a movement range of the discharge handle is assigned a movement range of the support, this movement range of the support being adapted to the pump stroke of the pump in the pump dispenser and its position relative to the first abutment on the housing. In the third angle portion, the positive coupling between the support and the discharge handle is preferably such that a movement of the discharge handle is not possible. This is achieved by the fact that the support is arranged at its end position counter to the first abutment on the housing, which end position is preferably defined by a counter-abutment on the housing. In this position, a further movement of the support away from the first abutment on the housing cannot take place, such that the discharge handle located in its stowage position and the support located in its end position together form a stable system in which a relative movement is not possible as long as the guide extension is located in the third angle portion. The control cam is preferably designed in the second control cam portion in such a way that it connects the first control cam portion and the third control cam portion to each other and, for this purpose, extends approximately in the form of part of a helix on an outer surface of the operative connection portion. When the guide extension of the discharge handle is located in this second control cam portion, a movement of the discharge handle leads only to a rotation of the support or of the operative connection portion, but not to an axial displacement of the support. Therefore, when the guide extension is arranged in the second control cam portion or in the third control cam portion, it is not possible to alter the position of the support in the axial direction.

In one development of the invention, the discharge device can be switched between the activated operating state and the deactivated operating state by means of an activation handle. Such an activation handle can be used by a user, before use of the discharge device, and to transfer the discharge device to the activated operating state. The activation handle is preferably a second handle next to the discharge handle. However, configurations are also conceivable in which only one handle is used, but it has two separate degrees of freedom, a first degree of freedom being used to change the operating state, and a second degree of freedom being used for a discharge procedure.

An activation handle is particularly preferred which is designed to be rotatable and is operatively connected with rotational coupling to the support. In the simplest case, the activation handle can be part of the support or be identical to the latter, such that this is handled directly by the user in order to change the operating state of the discharge device. However, an activation handle is also conceivable that is operatively connected to the support via a coupling, this affording the advantage that the axial movement of the support as a result of actuation of the discharge handle does not result at the same time in an axial movement of the activation handle.

In one particularly preferred development, the activation handle is connected to the support by means of a slip clutch. This ensures that the activation handle cannot be rotated out beyond a desired position and damage the support or the discharge handle. At the same time, a slip clutch allows the user to actuate the activation handle without having to take heed of an end position, since, after the activated or deactivated operating state is reached, an activation handle moving beyond this leads to a preferably appreciable slippage of the slip clutch.

In one particularly advantageous configuration of the slip clutch, the latter has a toothing whose teeth are at least partially elastically deformable such that they disengage when a defined resistance torque is overcome. This represents a very cost-effective form of a slip clutch, which additionally affords the advantage that characteristic noises are generated by the teeth of the toothing as they slide off on reaching the slip area, and these noises indicate to the user that he has reached the activated or deactivated operating state.

Particular preference is given to an activation handle designed as a portion of the outer housing, in particular as a rotatable base portion. This represents a technically simple design, which is additionally of advantage in terms of savings in material. The configuration as a rotatable base portion is also of advantage in view of the fact that such an activation handle cannot easily be confused with a normally lever-shaped discharge handle, which facilitates use for the end user.

The invention further relates to a discharge device preferably of the type in question, in particular one of the type described above, which has a centering cone for guiding a discharge tube of the pump dispenser into a receiving recess on the housing, the centering cone being arranged to be axially displaceable in the direction of the main axis at least between a first end position, in which it protrudes from the receiving recess in the direction of the pump dispenser, and a second end position, in which it does not impede an actuation of the pump dispenser.

Particularly in discharge devices whose housing is designed such that the pump dispenser, or the support together with pump dispenser, is pushed in in the direction of the main axis, a problem that occurs is that of precisely targeting a receiving recess provided on the housing for receiving a discharge tube of the pump dispenser. This is made easier by means of the centering cone provided according to the invention, since this protrudes from the receiving recess in the direction of the support and of the pump dispenser, such that the enlarged diameter of the centering cone, on its side directed toward the pump dispenser, permits easy insertion of the pump dispenser. The latter is thus guided with precision into the receiving recess. By virtue of the displaceable design of the centering cone, the latter can then be pushed away from its original position, particularly upon initial actuation of the discharge device, such that it is not in the way of an actuation of the pump dispenser. The centering cone is preferably arranged displaceably on a discharge tube which forms the first abutment on the housing and/or in which the receiving recess is formed. The centering cone preferably forms, together with a guide element, in particular said discharge tube, an interference fit, such that it is displaceable against a low frictional resistance.

The invention further relates to a discharge device preferably of the type in question, in particular one of the kind described above, in which the housing comprises at least two housing shells which can be joined together at connection areas extending substantially in a main axis of the housing, both ends of the housing shells in the direction of the main axis being provided with joining rings, which engage round both housing parts and fix them relative to each other.

Such a housing permits in particular a simple assembly of the components of the discharge device arranged in the housing. These can be fitted in a first housing shell, onto which the second housing shell is then placed, before both housing shells are fixed by means of the joining rings. The connection areas do not need to extend precisely in the direction of the main axis. It is important, however, that the at least two housing shells each extend into the area of the end faces of the discharge device, where they are held together by the joining rings. A housing of this type is very easily constructed and permits unproblematic assembly of the components provided in the housing. Thermal joining methods for the housing shells are not really essential, since, depending on the specific embodiment, the connection by means of the joining rings already suffices. It is preferable if, in the connection areas, there is a form-fit connection of the housing shells, which prevents the housing shells being displaced relative to each other.

For the joining rings, the housing shells are preferably provided with receiving grooves that fix the joining rings in their position in the axial direction. In a particular embodiment, the joining rings are designed as closed clamping rings which, in the assembled state of the housing shells, form an interference fit with the housing shells. For this purpose, the joining rings are preferably made of a material that can be deformed elastically.

In a particular embodiment of the invention, at least the joining ring provided on that end of the housing directed away from the discharge opening is formed integrally on a flat base portion. This one-piece component made up of base portion and joining ring accordingly assumes the twin function of, on the one hand, connecting the two housing shells to each other in the area of the base and, on the other hand, of closing off the bottom end of the housing.

Embodiments are particularly preferable in which a portion of a receiving space for an applicator is provided on each of the at least two housing shells, and these portions, in the assembled state, form an undercut receiving space for fixing the applicator. In the assembled state, the portions of the two or more housing shells form a complete receiving space in which a fixing portion of the applicator is arranged. This is fixed in its position on account of the undercut. This configuration makes it possible to use the same housing parts, except for the applicator, for different embodiments, which differ only in respect of the applicator. The fixing portion of the applicator is in each case identically designed in applicators of different types, whereas other portions of the applicator can be designed individually for the specific application, for example in respect of their shape or the size of the discharge opening. In a particularly preferred embodiment of the invention, the joining ring provided on that end of the housing directed toward the discharge opening comprises a bearing portion for bearing sealingly on the applicator. This is advantageous especially in applicators which, separate from the housing, are connected to the latter by being inserted into the receiving space. To ensure that no contamination can enter the housing and no liquid can escape from the housing in the area of the receiving space, a sealed connection between joining ring and applicator is created by means of this bearing portion.

The invention additionally relates to a discharge device of the type in question, in particular a development of the discharge device cited above, in which development the discharge handle is designed for discharge handling substantially transverse to the main axis and is connected to the support via at least one separate transmission element.

The transmission element is in this case not connected directly to the support or to the discharge handle, and it therefore executes a movement independent of the support and of the discharge handle during actuation of the discharge handle. Together with the discharge handle and the support, the transmission element forms a gear which, on the one hand, allows for a more flexible mode of action of an actuation of the discharge handle on the support and, on the other hand, also permits a more flexible arrangement of the discharge handle and a more ergonomic movement profile upon actuation of the discharge handle. An actuation of the discharge handle acts directly via a contact on the transmission element, which for its part can be mounted either pivotably or with linear movement. In a configuration with only one transmission element, this transmission element then acts on the support and moves the latter along the main axis to the first abutment on the housing. In addition to the design of the transmission element as transmission lever, a design as a wedge element or cam element that can be moved in translation is also regarded as particularly advantageous.

The transmission element and the discharge handle preferably engage in one another with a form fit in a direction perpendicular to the direction of an actuation movement. This means that, in the case of an unfavorable direction of the force during actuation, the discharge handle does not slip from the transmission element. The form-fit connection can be achieved in particular by webs and corresponding grooves extending along the path of the contact.

A configuration of the discharge device is particularly preferred in which there is a nonlinear relationship between the actuation movement of the discharge handle and the axial movement of the support. A nonlinear relationship of this kind is present when, as a function of the position of the discharge handle, an excursion of the discharge handle by a defined excursion path or angle results in a different size of axial movement of the support. Thus, the gear made up of discharge handle, transmission element and support can be designed such that, at the start of the movement of the discharge handle, a relatively short excursion path of the discharge handle leads to a comparatively long path of movement of the support. This has the advantage that the actuation force at the start of the actuation has to be relatively high, which requires a user to apply to the discharge device a considerable force that is sufficient to the completely finish the discharge device.

In one development of the invention, first contact portions between the discharge handle and the transmission element and/or second contact portions between the transmission element and the support are designed in such a way that the resistance torque or the resistance force against a movement of the discharge handle has a profile that declines across the actuation movement. In a preferred development of the invention, this can be achieved not just by the design and arrangement of the discharge handle, transmission element and/or support, but by a varying surface in the contact area between discharge handle and transmission element or between transmission element and support. Thus, in the unactuated starting position of the discharge handle, the mutually touching surfaces on the discharge handle and in the transmission element or on the transmission element and the support can have a particularly high coefficient of static friction and/or kinetic friction. The user then has to apply a considerable force in order to overcome this static friction at the start of the actuation. During the actuation, the points of contact on the discharge handle, transmission element and/or support shift, such that the respective points of contact arrive in an area distinguished by a particularly low coefficient of kinetic friction, thus keeping within limits the frictional losses after the static friction is overcome. The configuration of the surface may concern in particular the roughness of the surface.

Discharge devices are particularly preferred in which the first discharge handle is designed as a first pivotable lever and/or the transmission element is designed as a second pivotable lever, the first and second levers preferably being designed to move in opposite directions in the course of an actuation of the discharge handle. The design of the discharge handle and/or of the transmission element as pivotable levers is particularly simple and provides a high degree of reliability. As regards the discharge handle, the design as a pivotable lever additionally permits an ergonomically advantageous movement in which the actuation is effected using a thumb, the pivot axis of the first pivotable lever, which forms the discharge handle, lying near the anatomical pivot axis of the thumb.

In one development of the invention, the first and second levers are mounted in a common one-piece component, the component preferably being a housing portion. Mounting them in a one-piece component is advantageous since it means that the spacing between the pivot axes of the two levers is subject to only slight tolerances. This makes calculation of the transmission ratios of the two levers very easy and reproducible.

The invention is also achieved by a discharge device of the type in question, in particular a discharge device according to the above description, in which the discharge handle is designed as a first lever pivotable about a pivot axle which is provided on that side of the discharge device lying opposite the discharge opening.

By virtue of this arrangement of the pivot axle, the discharge handle can be moved by the thumb of the hand grasping the discharge handle. The discharge handle and the thumb move approximately parallel to each other, which is ergonomically advantageous, since the application of force to the lever can take place not just on the distal phalanx of the thumb, but along the entire length of the thumb.

A preferred development of the invention is one in which the outer wall and/or the support have control openings which are flush with a media reservoir of the pump dispenser and by means of which the filling level in the media reservoir can be visually detected. In a particularly advantageous configuration of the support with a beaker-shaped portion which lies opposite the first abutment on the housing and by means of which a force can be applied to the base of the media reservoir, these control openings are to be provided both in the beaker-shaped support and also in the outer wall. The control openings can be created by simple formation of free apertures or by insertion of transparent elements. It is likewise possible for the support and/or the outer housing to be made completely transparent.

In another preferred development, the discharge device has a protective cap which, preferably in a functional state, prevents the transfer of the discharge device to the activated operating state.

In this functional state, in which the protective cap is fitted onto the discharge device, it preferably engages around an area in which the discharge handle is provided, which requires that the discharge handle be located in the stowage state. This design of the protective cap means, on the one hand, that accidental transfer of the discharge device to the activated operating state is not accidentally possible with the protective cap attached. On the other hand, it additionally ensures that a user has to transfer the discharge device back to the deactivated operating state after use in order to fit the protective cap back onto the discharge device.

Another preferred embodiment of the discharge device is one in which the discharge handle is covered by an elastic wall portion, which is circumferentially connected to the housing. This elastic wall portion preferably seals the discharge device hermetically and thus avoids contamination. It is particularly preferable for the wall portion to be connected cohesively to the housing, which can be achieved, for example, by a choice of material in which the wall portion is made of TPE and the housing of PP.

The invention further relates to a method for fitting a pump dispenser into a discharge device intended to receive a pump dispenser and provided with a first abutment on the housing, the pump dispenser being able to be actuated by compression in the direction of a main axis, which method is characterized in that the pump dispenser is inserted into the discharge device, and the position of the pump dispenser relative to the position of the first abutment on the housing is adjusted with the aid of an adjusting means.

In discharge devices to which this method can be applied, the actuation of the discharge device is associated with a movement of a portion of the pump dispenser which is displaced in the direction of the first abutment on the housing, such that this first portion of the pump dispenser is moved relative to a second portion of the pump dispenser that comes to bear on the abutment on the housing, and this results in an actuation of the pump provided on the pump dispenser. The adjusting means make it possible to compensate for various manufacturing tolerances and assembly tolerances inside the discharge device and in particular inside the pump dispenser by a permanent setting afforded with the aid of the adjusting means, such that, after said setting, the pump dispenser is located in a defined position relative to the first abutment on the housing. This leads to a high degree of reproducibility of the behavior of the discharge device during actuation. Despite different component tolerances, discharge devices of identical construction cannot be distinguished by the user in terms of their discharge behavior.

In one development of the method, the adjustment takes place in a compressed state of the pump dispenser. In this compressed state, the pump in the pump dispenser is located at the end of its pump stroke. If the adjustment is made in this state, it is possible to ensure that this state is achieved reproducibly upon an actuation of a discharge handle of the discharge device. This ensures that the complete pump stroke is traveled and that a predefined amount of medium can therefore be completely discharged.

In one development of the invention, the adjustment is such that the pump dispenser is in the actuated state when the discharge handle, or a component operatively connected to it, comes up against an associated second abutment. This means that the discharge handle, or the component operatively connected to it, in particular a support for receiving the pump dispenser, or the pump dispenser itself, is driven onto the second abutment and, in this state, with the pump dispenser compressed, the adjustment takes place such that the pump dispenser is kept in this position. This results in standardization of a state which, in normal operation of the discharge device, is reached at the end of the discharge procedure. If the discharge device is actuated later in operation, a compression of the pump dispenser accordingly takes place until it is compressed so far that the pump stroke of the pump located in the pump dispenser is completed. As soon as this state is reached, the discharge handle, or the component operatively connected to it, reaches the second associated abutment, such that an actuation of the discharge handle beyond this state cannot take place. The pump provided in the pump dispenser is thus protected against being overloaded, since an actuation of the discharge handle beyond this is prevented by the second abutment.

BRIEF DESCRIPTION OF THE DRAWINGS

Further advantages and features of the invention will become evident from the claims and from the following description of two preferred illustrative embodiments of the invention shown in the drawings.

FIGS. 1 to 8 show a first embodiment of a discharge device according to the invention where:

FIGS. 1 and 2 show the discharge device in a cross-sectional view in a delivery state, FIGS. 4 and 5 show a cross-sectional view of the discharge device before the pump dispenser is fitted, FIGS. 6 and 6*a* show a cross-sectional view of the discharge device with the fitted pump dispenser, FIG. 7 shows a cross-sectional view of the pump dispenser in an activated state, and FIG. 8 shows the discharge device during actuation.

FIG. 9 shows a cross-sectional view of the discharge device in the unactuated state during assembly, FIG. 10 shows a cross-sectional view of the discharge device in the unactuated state, FIG. 11 shows a cross-sectional view of the discharge device in the actuated state, FIG. 12 shows an exploded view of the housing of the discharge device, FIG. 13 shows a view of the actuating mechanism, and FIG. 14 shows a transverse section through the discharge device.

DETAILED DESCRIPTION OF THE ILLUSTRATIVE EMBODIMENTS

Figure 1:
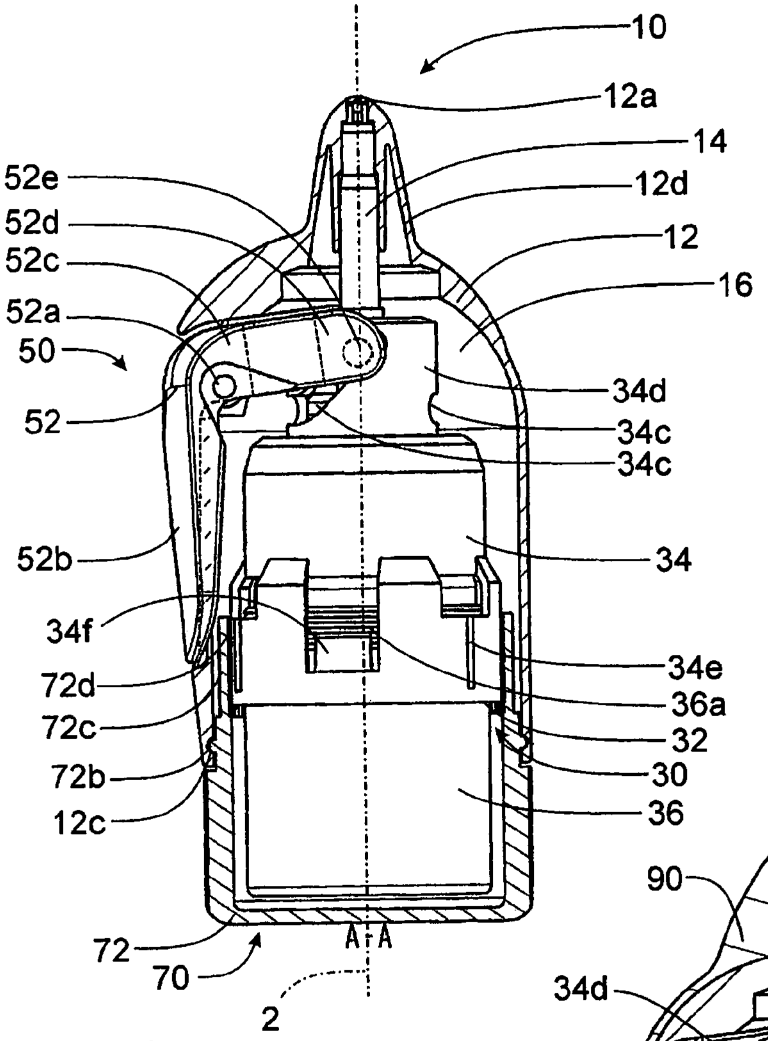
Figure 2:
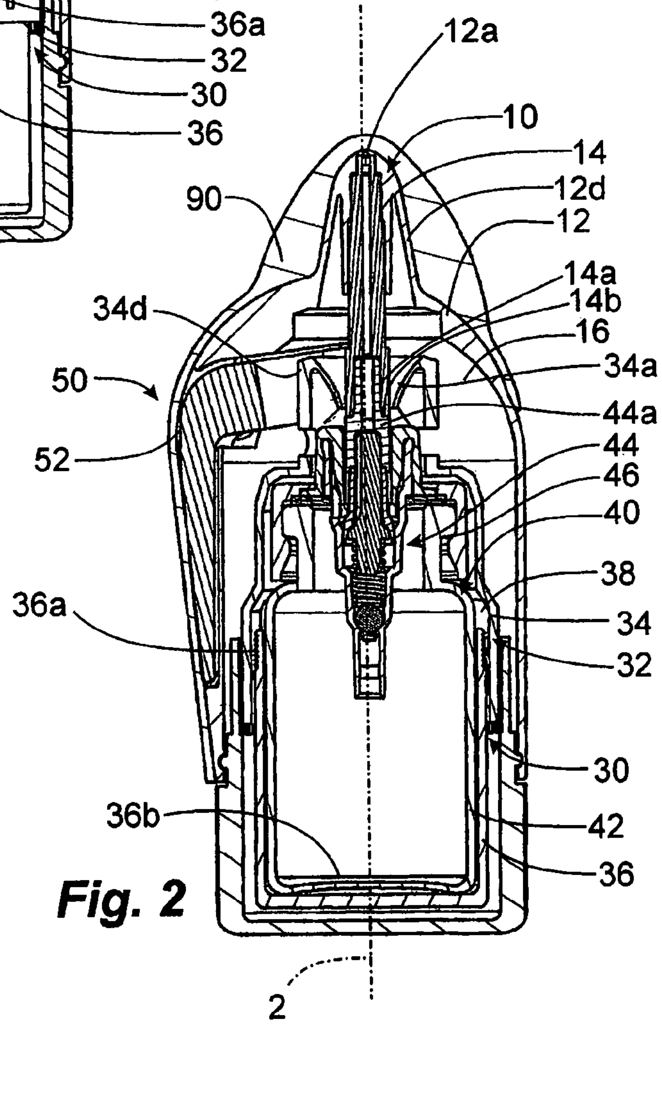

FIGS. 1 and 2 show a first embodiment of a discharge device according to the invention; the views depict the same state but differ to the extent that in FIG. 1 only a housing 12 of the discharge device is shown in cross section, whereas in FIG. 2 the whole discharge device is shown in cross section. Moreover, in the state shown in FIG. 2, the discharge device has a protective cap 90.

The discharge device comprises a total of four component groups 10, 30, 50, 70 which, in operation, can each move relative to each other in various ways and are in themselves substantially stationary. The first component group 10 consists of an outer housing 12 and of a filler piece 14 which is securely inserted into the outer housing in the area of a discharge opening 12*a*. The filler piece 14 extends from an applicator 12*d*, formed by the housing, along the direction of a main axis 2 of the discharge device into an inner space 16 surrounded by the housing 12. The second component group 30 comprises a support 32 which, as separate component parts, has an upper support portion 34 and a lower support portion 36. The support portions 34, 36 surround a free space 38 into which a pump dispenser 40 is fitted. This pump dispenser 40 corresponds to a commercially available pump dispenser and comprises an approximately cylindrical media reservoir 42 to which a pump system 44 is secured by means of a snap-fit connection 46. The pump system 44 is a conventional pump system which is actuated via a relative displacement of a discharge tube 44*a* relative to the media reservoir 42. The discharge tube 44*a* extends along the main axis 2 into the filler piece 14, the upper support portion 34 for this purpose having a central through-aperture 34*a*. The pump dispenser 40 can be pressed in the direction of the discharge opening 12*a* by a base surface, acting as functional portion 36*b*, of the lower support portion.

The upper support portion 34 is connected to the lower support portion 36 via locking means 34*f*, 36*a*. As regards the lower support portion 36, the locking means 36*a* are composed of a locking ladder 36*a* extending circumferentially about the upper end of the beaker-shaped lower support portion 36. As regards the upper support portion 34, the locking means comprise a series of locking tongues 34*f*. As a result of the design of the locking means 36*a* as circumferential locking ladder and a special configuration of the locking tongues 34*f* in terms of their arrangement, which will be explained below, the locking means 34*f*, 36*a* permit a large number of different locking positions, such that the relative position of the upper support portion 34 with respect to the lower support portion 36 can be fixed in a large number of different positions.

The support component group 30 is movable in two ways relative to the housing component group 10. On the one hand, the support component group 30 can be displaced substantially in its entirety along the main axis 2 in the direction of the filler piece 14. On the other hand, the support component group 30 can be rotated about the main axis 2 relative to the housing component group 10. Both degrees of freedom and their coupling are explained in more detail below.

The third component group 50 is the component group of a discharge handle 52, which is designed as an approximately L-shaped pivotable lever. A first branch 52*c* of the one-piece lever 52 extends into the housing 12, whereas a second branch 52*b* extends approximately parallel to the main axis 2, in the state shown in FIGS. 1 and 2, in the area of an outer surface of the housing 12. The lever 52 is designed to be pivotable relative to the housing 12, the pivot axis being defined by two axle portions 52*a*. The branch 52*c* protruding into the housing 12 divides like a fork into two portions 52*d*, at the ends of which there is in each case a guide extension 52*e*. The guide extensions 52*e* point toward each other. They each protrude into a control cam 34*c* provided on a cylindrical operative connection portion 34*d* of the upper support portion 34 of the support 32.

The fourth component group 70 is the component group of the activation handle 72. The activation handle is provided on that side of the housing 12 directed away from the discharge opening 12*a* and is approximately cylindrical and beaker-shaped. Provided on a circumferential surface 72*a* there is a circumferential guide ring 72*b*, which is received in a groove 12*c* of the housing 12. The housing 12 and the activation handle 72 form a clearance fit, such that the activation handle 72 is designed to be able to rotate about the main axis 2 relative to the housing. This at the same time represents the only degree of freedom of the activation handle 72 with respect to the housing 12 during operation. At an upper edge 72*c*, the activation handle 72 has an inner toothing 72*d*. This is designed to interact with an outer toothing 34*e* on the first support portion 34 of the support 32. While the inner toothing 72*d* completely covers a portion of the inside face of the activation handle 72, the toothing 34*e* on the first support portion 34 is limited as a whole to only three teeth 34*e* distributed about the circumference.

Further parts of the various component groups and their function will be explained in connection with the individual description of individual components, FIGS. 3*a* to 3*b*, with the description of the assembly of the discharge device, shown in FIGS. 4 to 6*a*, and with the description of the intended actuation of the discharge device, shown in FIGS. 7 and 8.

Figure 3A:
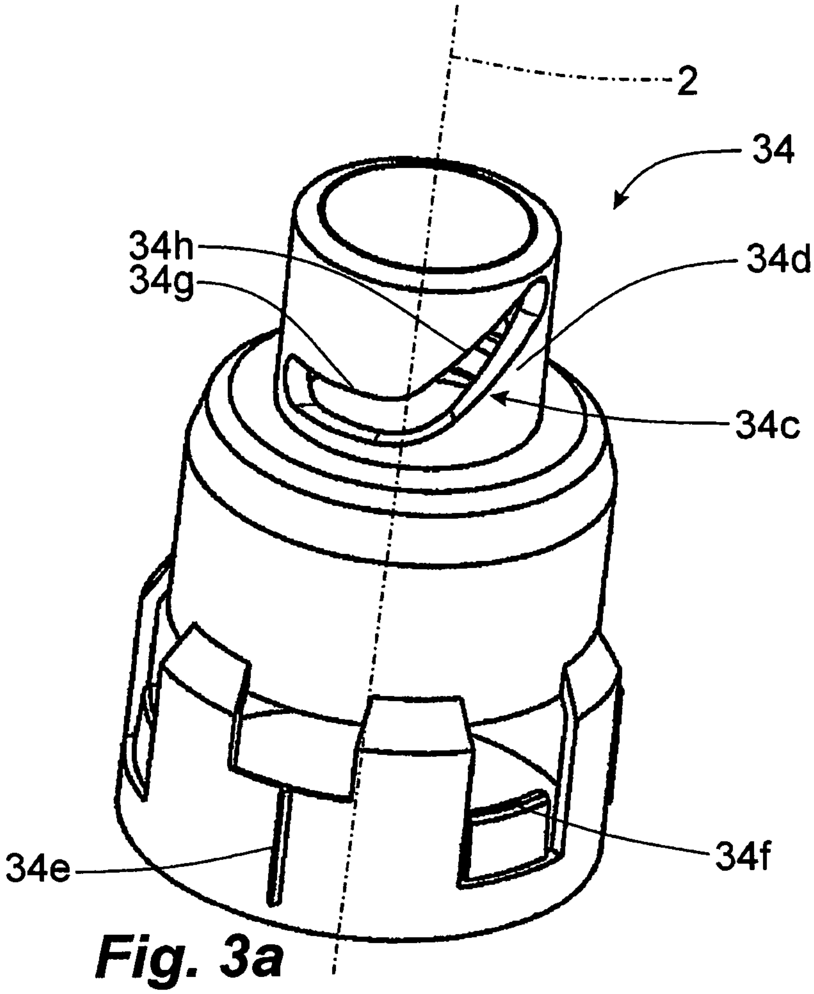
FIGS. 3*a* to 3*e* show different component parts of the discharge device.

FIG. 3*a* shows the upper support portion 34. In terms of its basic form, this has a substantially rotationally symmetrical configuration. At its upper end, it has a cylindrical operative connection portion 34*d*, in which the two control cams 34*c* are provided axially symmetrically with respect to the main axis 2. The control cams each comprise a first control cam portion 34*g*, which extends in a plane to which the main axis 2 forms the normal. This first control cam portion 34*g* is adjoined by a second control cam portion 34*h*, which extends approximately in the shape of a portion of a helix along the circumferential surface of the operative connection portion 34*d*. That end of the support portion 34 opposite the operative connection portion 34*b* is provided with the outwardly directed teeth 34*e* for operative connection to the activation handle 72 and also with the locking means comprising the inwardly directed locking tongues 34*f*.

Figure 3B:
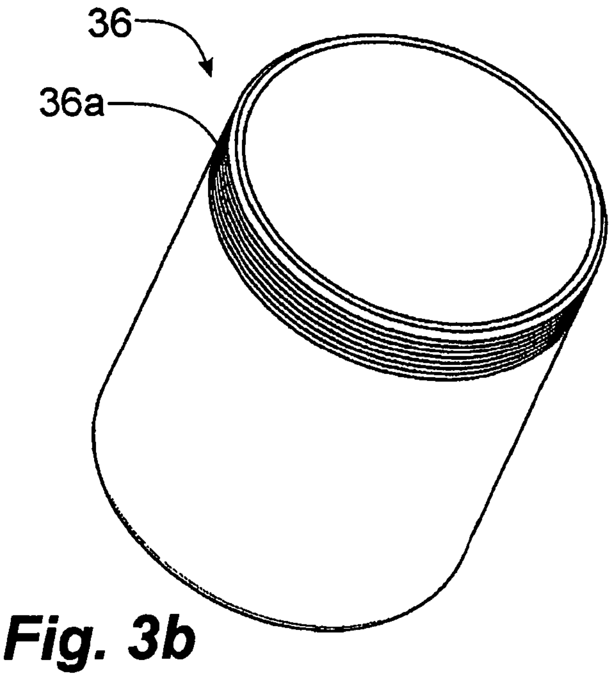
Figure 3C:
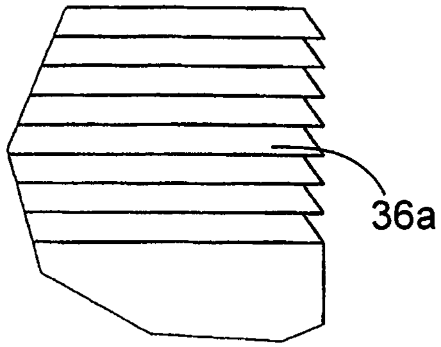

FIG. 3*b* shows the lower support portion 36. This is of a very simple construction. It has an approximately beaker-shaped basic form, of which the outer surface, in an edge area, is provided with the circumferential locking ladder 36*a* for interaction with the locking tongues 34*f*, said locking ladder 36 again being shown enlarged in FIG. 3*c*.

Figure 3D:
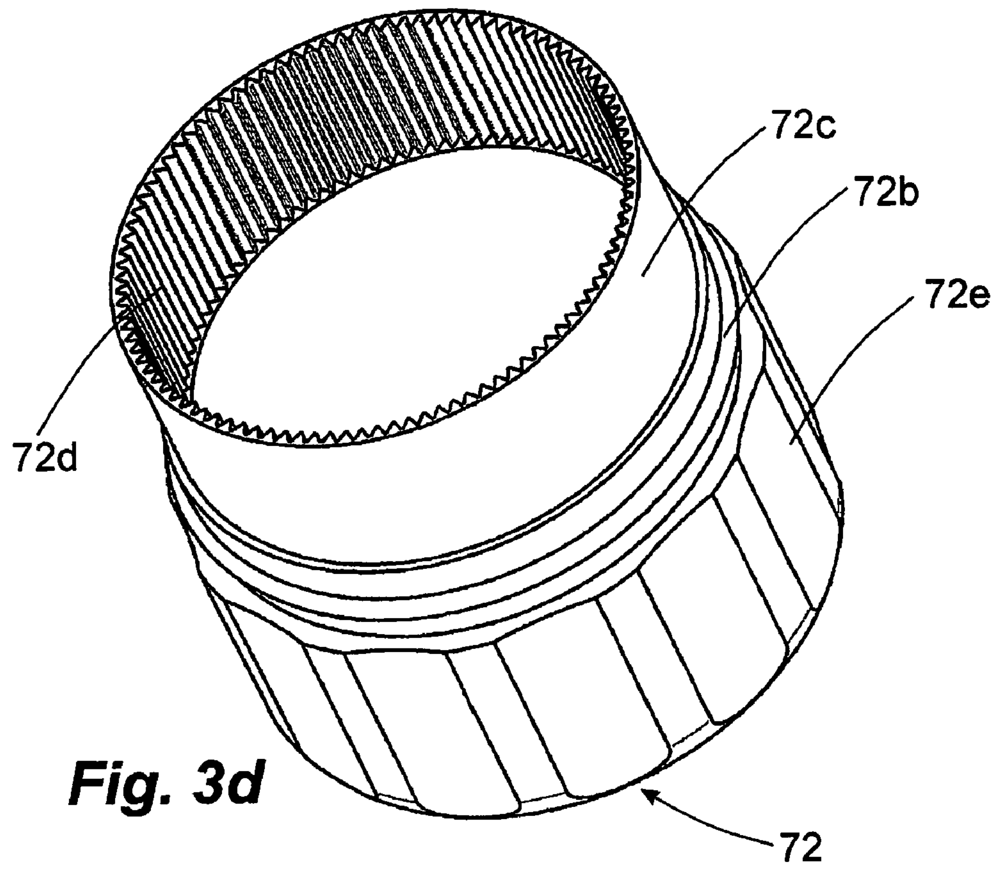

FIG. 3*d* shows the activation handle 72. This too is approximately beaker-shaped and, on the outer surface in a lower area, it has grip depressions 72*e* for easier handling and, above the grip depressions 72*e*, the locking ring 72*b*. The inner toothing 72*d* is provided at the upper edge area 72*c*.

Figure 3E:
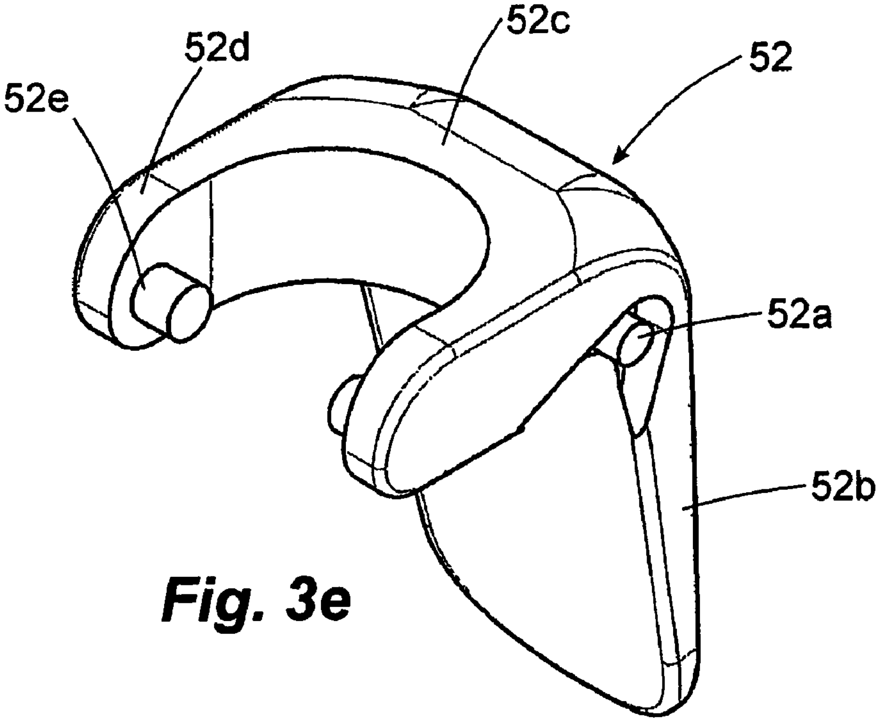

FIG. 3*e* shows the discharge handle 52 in a detailed view. This shows one of the two axle portions 52*a* which together define the pivot axis relative to the housing 12. It also shows the fork-shaped configuration 52*d* of the upper branch 52*b*, and also the two guide extensions 52*e*, which are intended to be received in the control cams 34*c* of the upper support portion 34.

Figure 4:
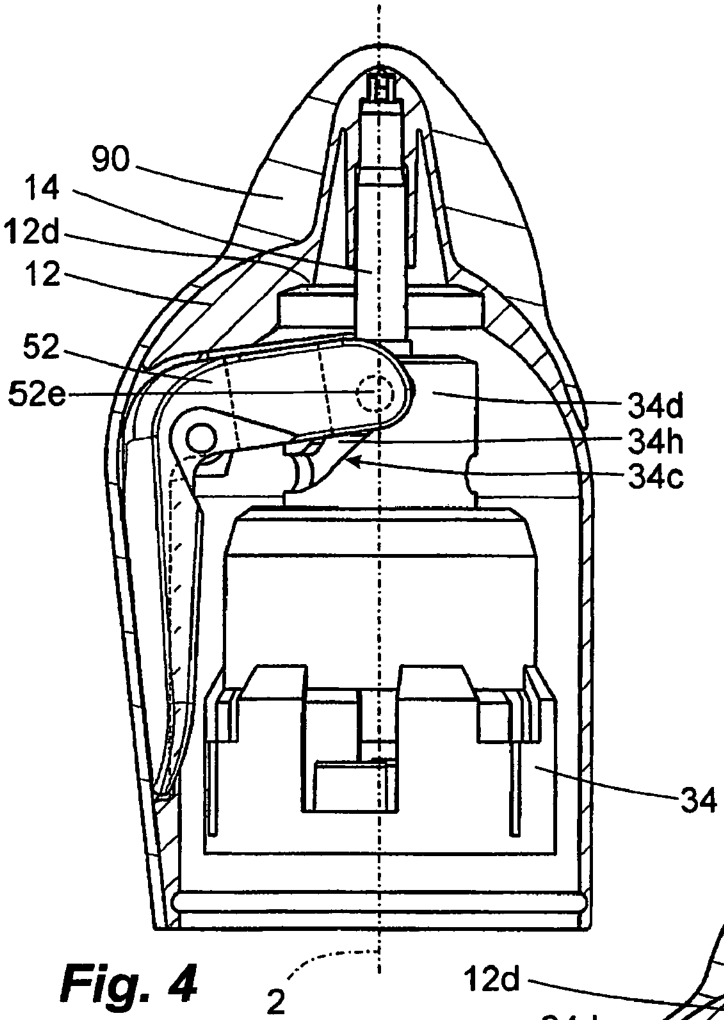
Figure 5:
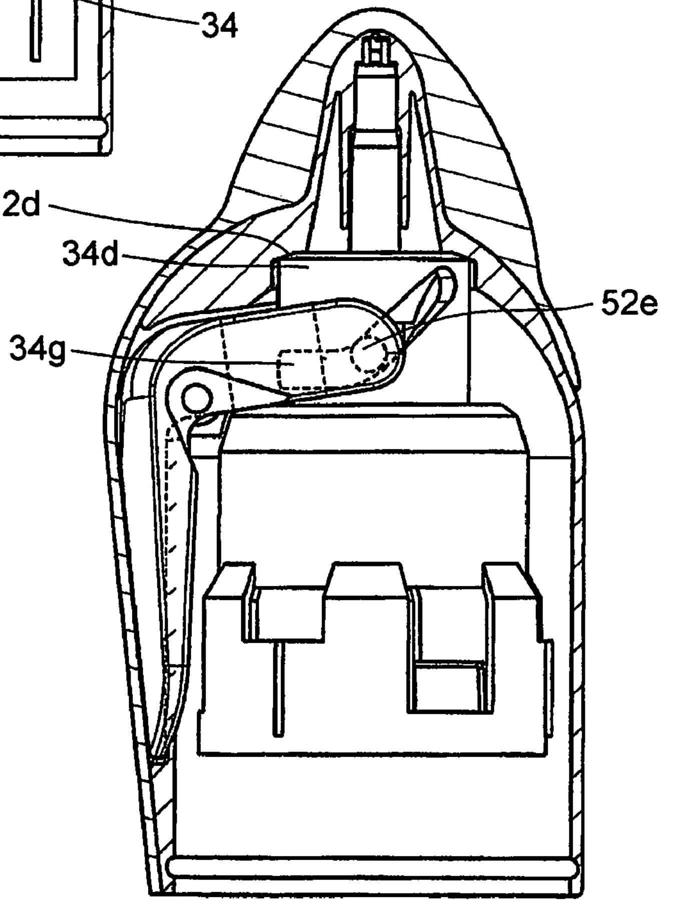
Figure 6:
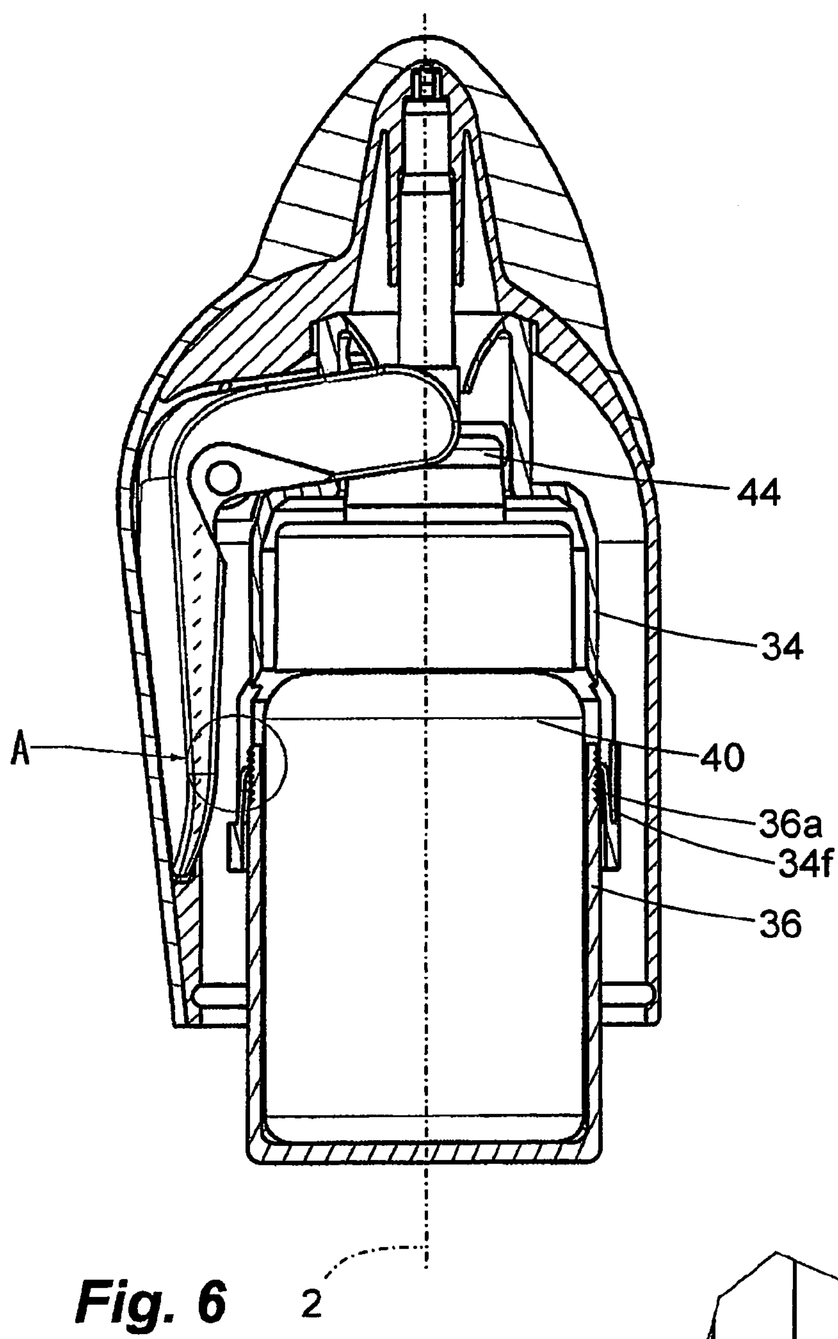
Figure 6A:
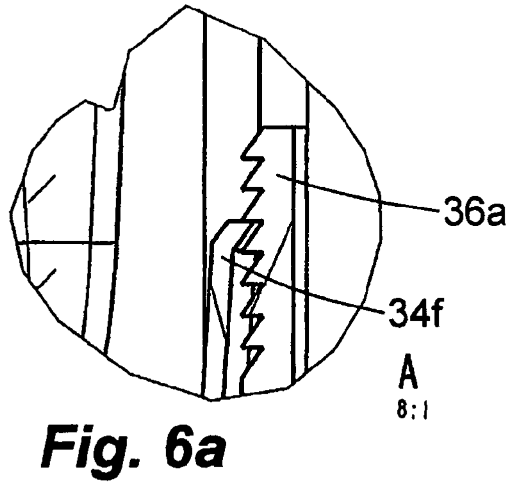
Figure 7:
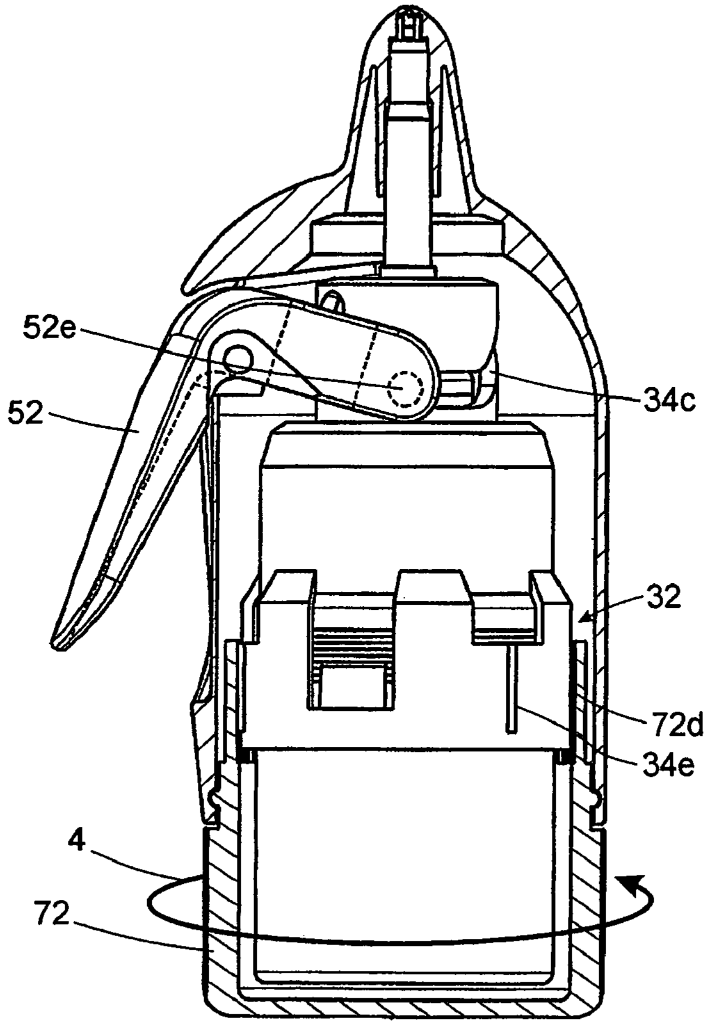

FIGS. 4 to 6*a* show the assembly of the discharge device, in particular the fitting of the pump dispenser 40. In FIGS. 4 and 5, the discharge device can be seen without activation handle 72.

Assembly takes place in the state shown. The discharge device consists at this point of the housing component group 10, the discharge handle 52 and the upper support portion 34. The protective cap 90 is also fitted, such that a relative movement between the discharge handle 52 and the housing 12 is not possible. The only mobility that the discharge device has in the state shown in FIGS. 4 and 5 is the mobility of the upper support portion 34 relative to the other component parts. The upper support portion 34 can be displaced axially on the filler piece 14, and, because of the control cams 34*c* and the guide extensions 52*e* projecting into these, such a displacement entails a rotation of the upper support portion 34 about the main axis 2. In a first assembly step, the upper support portion 34 is rotated in a superposed movement and displaced upward in the direction of the filler piece 14, until its operative connection portion 34*d* comes to bear on a second abutment 12*d* provided on the housing. Here, the guide extensions 52*e* of the discharge handle 52 are at all times located in the second control cam portion 34*h*. Even in the end position, which is shown in FIG. 5 and in which the operative connection portion 34*d* bears against the second abutment 12*d* provided on the housing, it is not possible for the guide extensions 52*e* to pass into the first control cam portion 34*h*.

In the state in FIG. 5, the pump dispenser 40 together with the lower support portion 36 is pushed into the upper support portion 34. The state to be reached by doing so is shown in FIG. 6. During this assembly, the discharge tube 44*a* arrives in a receiving recess 14*a* provided for it in the filler piece 14. The edge 14*b* of this receiving recess 14*a* constitutes a first abutment provided on the housing. The pushing-in of the pump dispenser 40 together with the lower support portion 36 is not ended as soon as the discharge tube 44*a* lies flush on the first abutment 14*b* provided on the housing. Instead, the lower support portion 36 and the pump dispenser 40 are pushed further in until the pump system 44 of the pump dispenser 40 is in the compressed, that is to say actuated state. The fact that this state is achieved is achieved by a defined assembly force acting in the direction of the main axis 2, which force is such as to ensure both the bearing of the discharge tube 44*a* on the first abutment 14*b* on the housing and also the complete compression of the pump dispenser 40. The variations in terms of the required actuation force for the pump system 44 also have to be included here. During the pushing-in of the pump dispenser 40 and lower support portion 36 into the upper support portion 34, a locking connection is obtained between the locking means 36*a*, 34*f*. This can be seen particularly from FIG. 6*a*. A particularly fine division is ensured by the special offset design of the locking tongues 34*f*, such that, after assembly of the pump dispenser 40 and lower support portion 36 has been completed, only a slight axial re-extension of the support 32 is to be expected. The last assembly step then involves the activation handle 72 being pushed into the housing 12, the toothing 72*d* of the activation handle 72 coming into engagement with the teeth 34*e* on the outside of the upper support portion 34. The finished assembled state then reached corresponds to the view in FIG. 2.

The actuation of the assembled discharge device will now be explained.

The actuation starts from the state in FIG. 1. The protective cap 90 has already been removed in this state, and the discharge device is still in the deactivated operating state, as can be seen from the fact that the guide extensions 52*e* are located in the second control cam portions 34*h* of the control cams 34*c*. An actuation of the discharge handle 52 is possible in this state only insofar as the discharge handle 52 can be manually pivoted out clockwise with respect to the perspective in FIG. 1; this has no effect on the position of the support 32 in the direction of the main axis 2, and instead only causes a rotation of the support 32 about the main axis 2. To be able to start a discharge procedure, starting from the state shown in FIG. 1, the activation handle 72 is first turned in rotation direction 4. This is shown in FIG. 7. The slip clutch, formed by the toothing 72*d*, 34*e*, ensures that this rotation movement is transmitted to the support 32, which is thus rotated together with the activation handle 72. This rotation of the support 32 has the effect that the control cams 34*c* are also rotated, leading to a downward movement of the guide extensions 52 and pivoting-out of the discharge handle 52 in the clockwise direction. The guide extensions 52*e* pass into the area of the first control cam portion 34*g*. During the rotation movement of the activation handle 72 and also during the subsequent operation, the activation handle 72 and the support 32 remain in constant operative connection with each other by means of the toothing 72*d*, 34*e*. As soon as the state in FIG. 7 is reached, in which the guide extensions 52*e* are located inside the first control cam portion 34 of the control cam 34*c*, the activated operating state of the discharge device is thus also reached. Overwinding is not possible, since, after the guide extensions 52*e* have reached the end of the control cam 34*c*, a movement continuing beyond this causes a slipping of the slip clutch 34*e*, 72*d*. An actuation of the discharge handle 52 in the state reached no longer causes a rotation of the support, as was previously the case when the guide extensions 52*e* were located inside the second control cam portion 34*h*.

Figure 8:
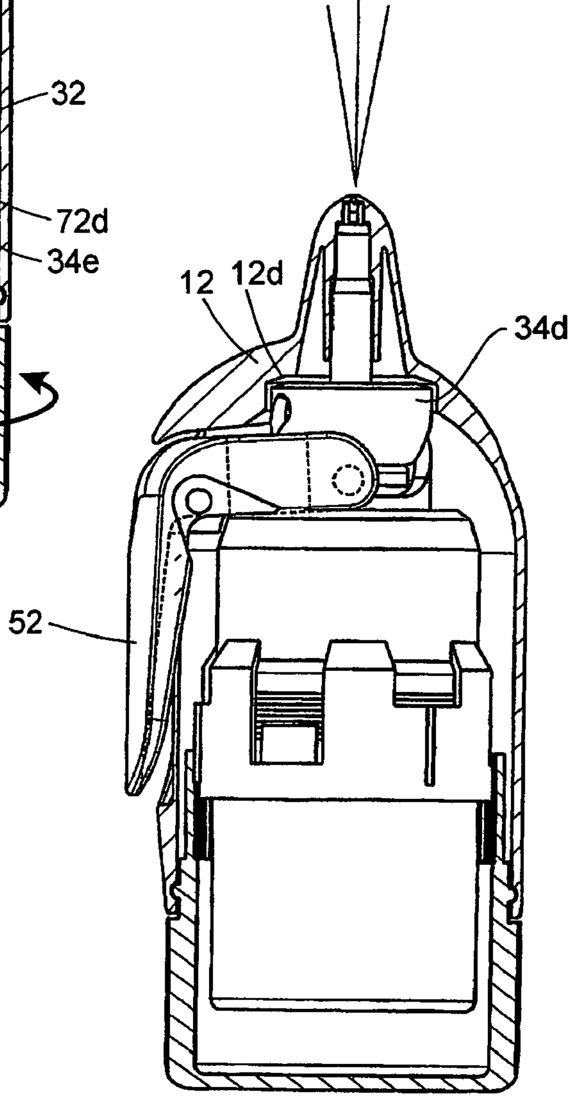

FIG. 8 shows the actuation of the discharge handle 52 and the resulting discharge device. In a manner not shown in FIG. 8, the discharge tube 44*a* of the pump dispenser 40 is pressed against the first abutment 14*b* of the filler piece 14 and is in this way displaced relative to the media reservoir 42 of the pump dispenser 40 counter to a spring force of a restoring spring of the pump system 44. This leads to a pumping procedure, which ends at the latest when the operative connection portion 34*d* of the upper support portion 34 abuts against the second abutment 12*d* of the housing 12. The manner of assembly described above ensures that, independently of the actuation force actually required, which is specific for the pump dispenser 40 used, the pump stroke of the pump system of the pump dispenser 40 is also traveled at this moment, such that the desired amount of the medium has been discharged. After the actuation force is released, the discharge device is returned to its starting position by the restoring force of the spring of the pump system.

The discharge device illustrated combines very practical handling, through separate activation and actuation, with a particularly advantageous manner of assembly through which tolerances in the components are compensated, and also with a likewise advantageous pump safety means in the form of the second abutment on the housing, which prevents overloading of the pump system of the pump dispenser.

FIGS. 9 to 12 show a second embodiment of a discharge device according to the invention. The basic mode of function is similar here to the mode of function of the first embodiment. This discharge device too is based, in terms of the discharge procedure, on the fact that a pump dispenser 140 is axially displaced relative to a first abutment 114*b* on the housing by means of a discharge handle 152. In a similar way to the embodiment in FIGS. 1 to 8, the position of the pump dispenser relative to the first abutment 114*b* on the housing is adjustable with the aid of locking means 134*f*, 136*a*, so as to be able to compensate for component part tolerances of the pump dispenser 140 and of the component parts of the discharge device.

Figure 14:
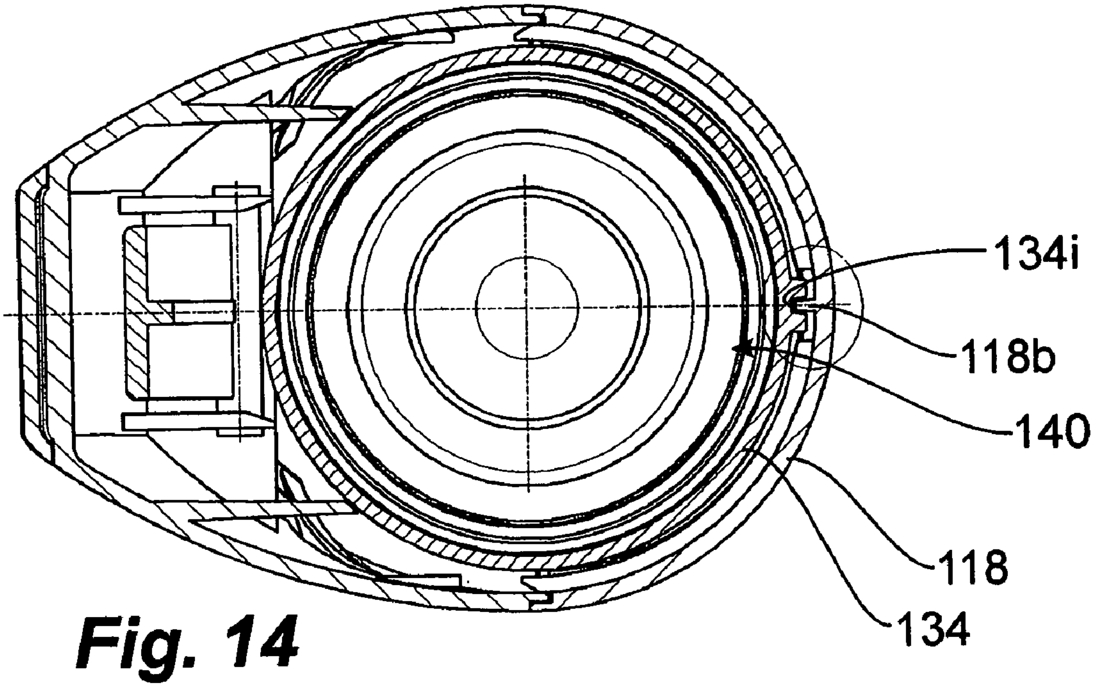

The assembly too is done in a similar way to the first embodiment in FIGS. 1 to 8. Starting from the state shown in FIG. 9, the inserted support 132, consisting of an upper support portion 134 and a lower support portion 136, is pressed in the direction of the discharge opening 122*a* until an upper end 132*a* of the support reaches a second abutment 112*d* on the housing. During this process, or subsequently, the support 132 is compressed with the aid of the locking means 134*f*, 136*a* such that the pump system of the pump dispenser 140 reaches its actuated end-of-stroke position by pressing-in of a discharge tube 144*a* of the pump dispenser 140, while the discharge tube 144*a* bears on the first abutment 114*a* on the housing. To prevent a situation where, on account of the handling prior to assembly, the upper support portion 134 comes to be in an unsuitable position for assembly, an anti-rotation means is provided. This consists of an axially extending web 118*b* which is formed integrally on the housing and engages in a groove 134*i* provided on the upper support portion 134. At the time of assembly, therefore, it is possible to assume a defined orientation of the upper support portion 134. This form-fit connection of the web 118*b* to the groove 134*i* is shown in FIG. 14.

Figure 11:
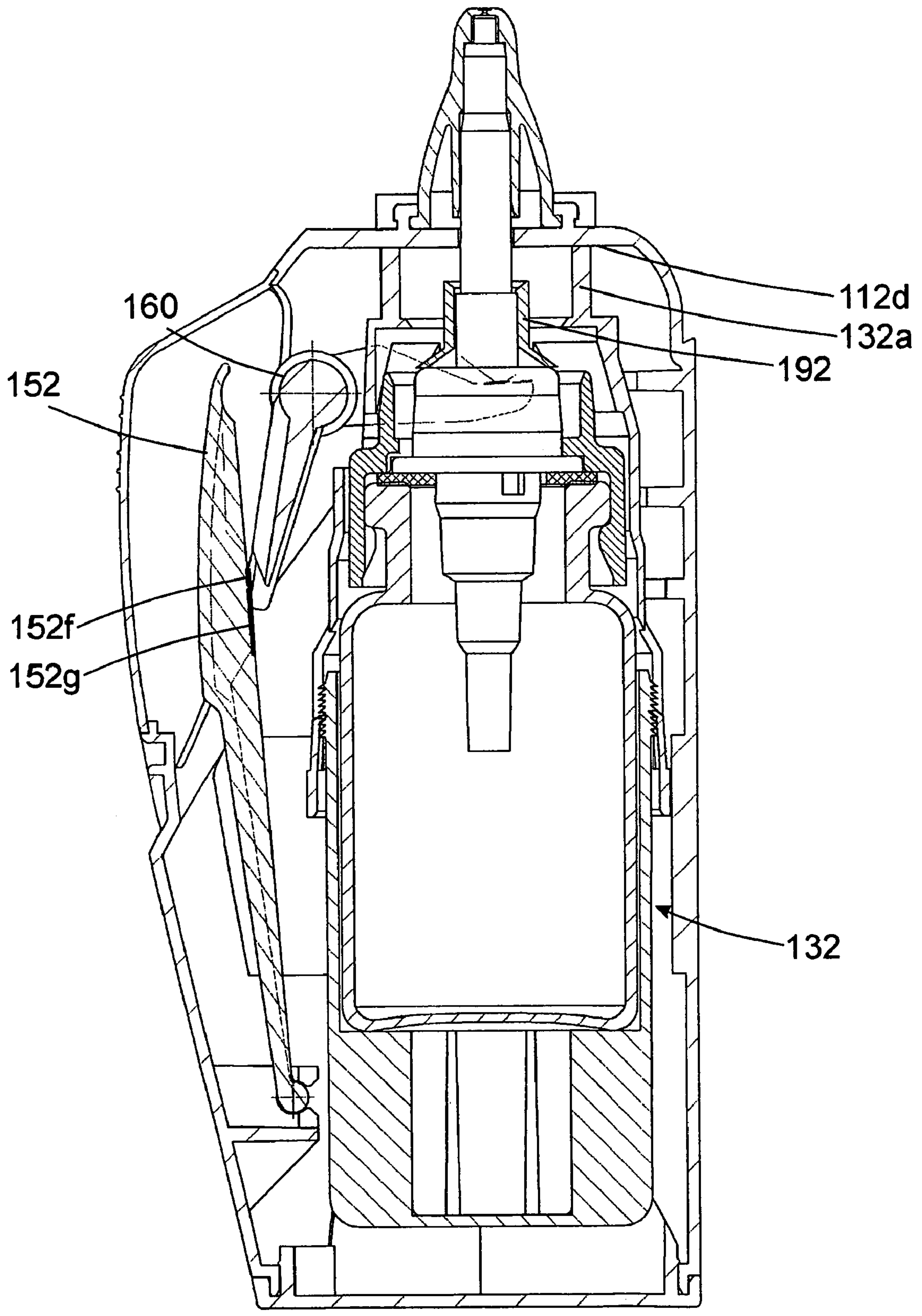
Figure 12:
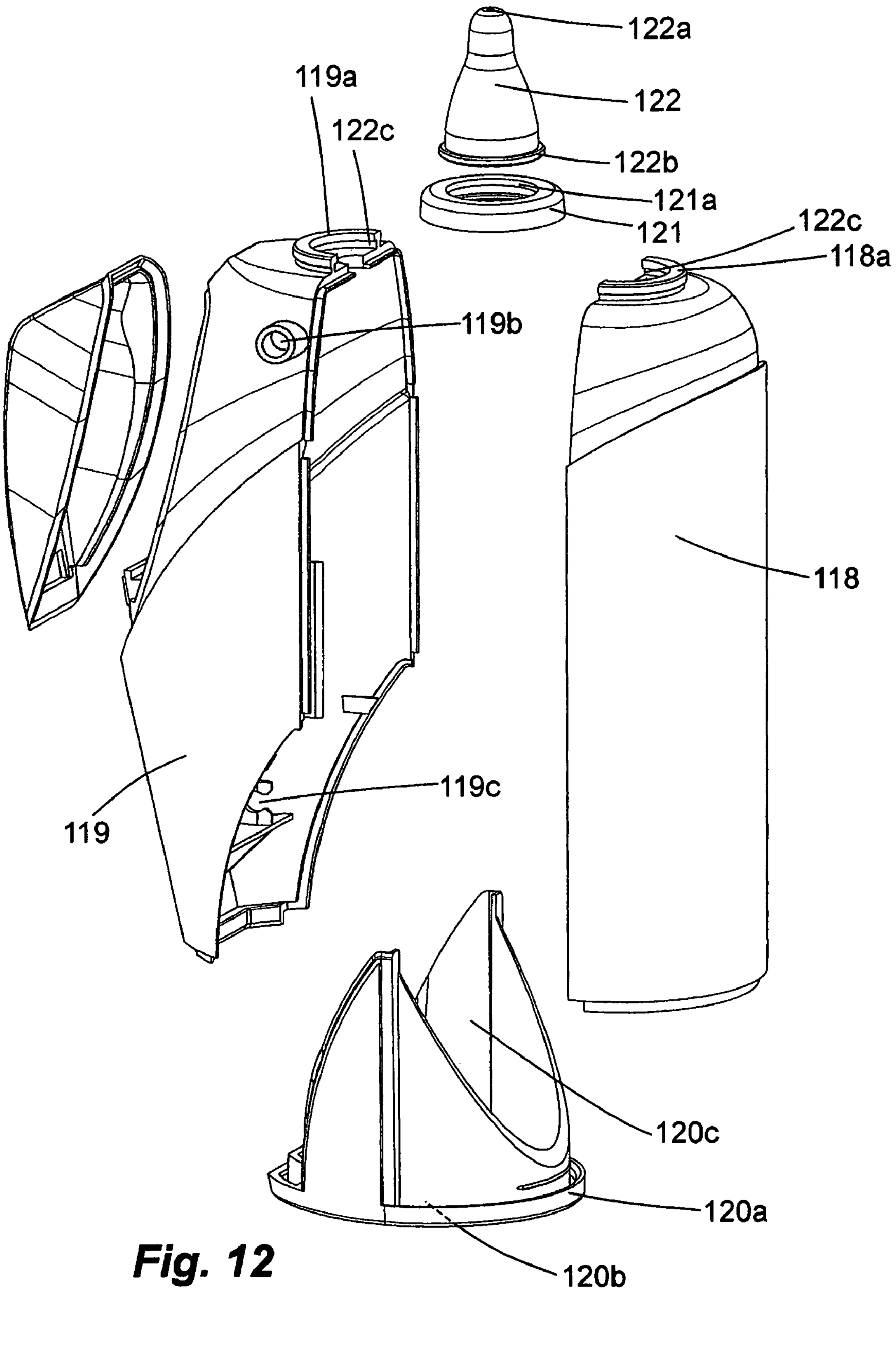

The final state of assembly corresponds to the actuated state, which is shown in FIG. 11.

Figure 10:
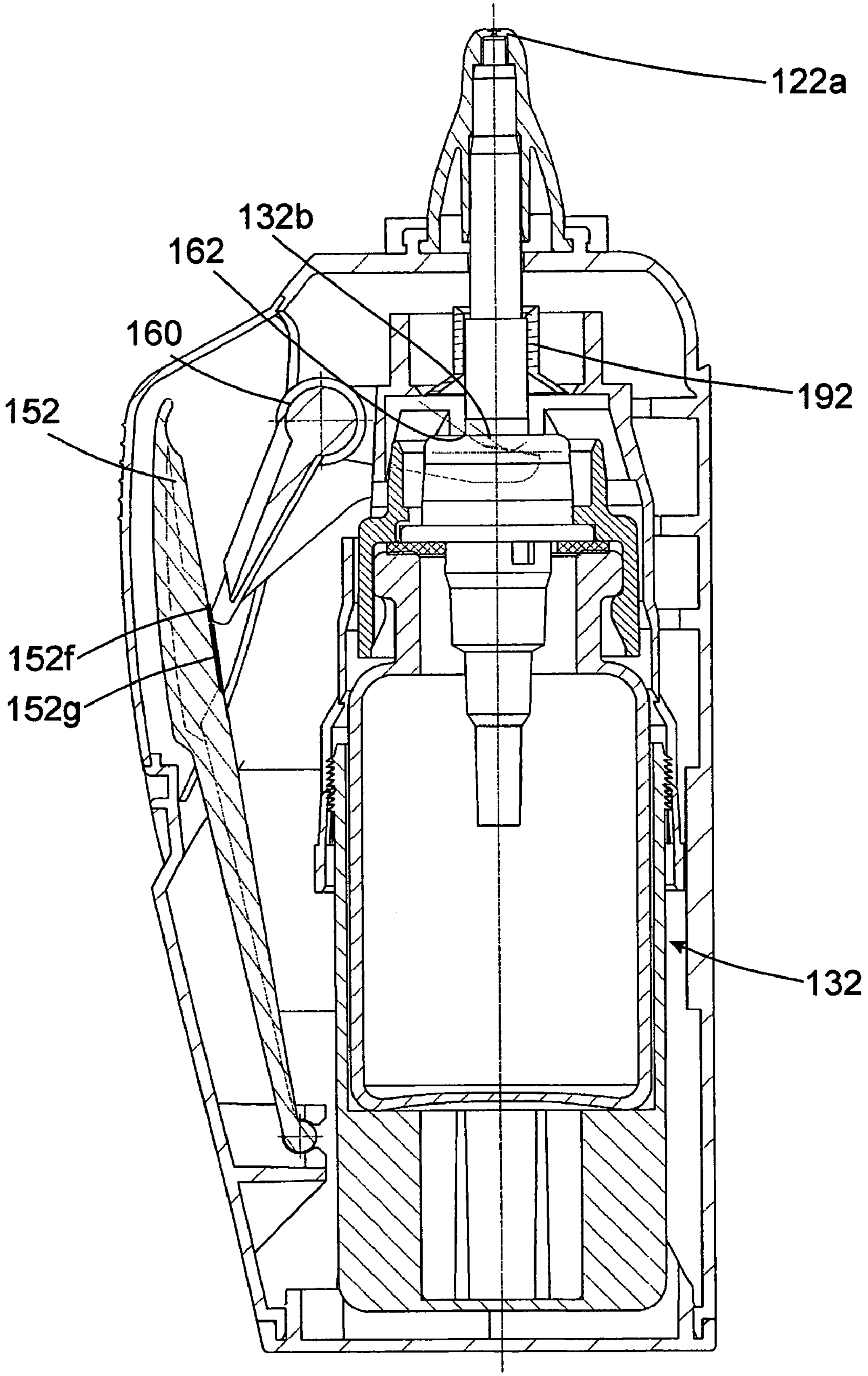

FIG. 10 shows the unactuated state after assembly. Starting from this state, by actuating the discharge handle 152, the support 132 can be lifted by way of the transmission lever 160. The operative connection between the transmission lever 160 and the support 132 is effected via two branches 162 of the transmission lever, which are only indicated symbolically in the drawings, and a corresponding projection 132*b* (likewise only indicated symbolically) of the support. The branches 162 engage around a neck of the support 132 below the projection 132*b*.

FIG. 11 shows how the support 132 is lifted, by pivoting of the transmission lever 160, and an actuation of the pump dispenser 140 by means of the first abutment 114*b* on the housing is thus achieved. An actuation beyond the state shown in FIG. 11 is not possible, since this is prevented by the upper end 132*a* of the support 130 coming to bear on the second abutment 112*d* provided on the housing.

Important differences between the discharge devices of FIGS. 1 to 8, on the one hand, and of FIGS. 9 to 12, on the other hand, lie in the structure of the housing, of the centering aid for guiding the support into the housing, and of the discharge handle 152.

Whereas the housing 12 in the embodiment of FIGS. 1 to 8 is designed as a substantially one-piece housing into which the support component group 30 is axially inserted, the housing 112 of the second embodiment of the discharge device according to the invention has a different structure. As can be seen from the exploded view in FIG. 12, it comprises two housing shells 118, 119 which, in a plane substantially parallel to the main axis 102, have joining areas at which they are fitted onto each other. The connection of the two housing shells 118, 119 is fixed by two joining rings 120*a*, 121, of which the joining ring 120*a*, which closes the housing 112 of the discharge device at the bottom end, is designed in one piece with a base portion 120*b* and smaller side wall portions 120*c*. The joining ring 120*a* is dimensioned such that it forms an interference fit with the housing shells 118, 119 and thus presses the two housing shells onto each other. The discharge opening 122*a* is provided in a separate applicator component 122 which, at its end opposite the discharge opening 122*a*, has a collar 122*b* that is received in an undercut chamber 122*c* formed on the housing shells 118, 119 by two approximately semicircular T-shape profiles 118*a*, 119*a* integrally formed on the housing shells 118, 199. The second joining ring 121 encloses these T-shape profiles and thus joins the two housing shells 118, 119 securely to each other in the area of the applicator 122. At the same time, the joining ring 121 has a sealing portion 121*a*, which bears sealingly on the outer wall of the applicator component 122.

The illustrated housing design is particularly easy to produce and is advantageous in respect of assembly. It allows the support 132 to be fitted into one of the two housing shells 118, 119 and for the latter then to be connected to the second housing shell 119, 118, as a result of which it may no longer be necessary to insert the support axially. In addition, it allows the discharge handle, designed as actuation lever 152, and a transmission lever 160 to be fitted in two respective bearings 119*b*, 119*c* that are provided in the same housing shell 119. This is of course also conceivable in principle in a one-piece housing, but the elastic deformability is greater in an individual housing shell than in a one-piece overall housing. This facilitates assembly without adversely affecting the stability during operation.

Figure 9:
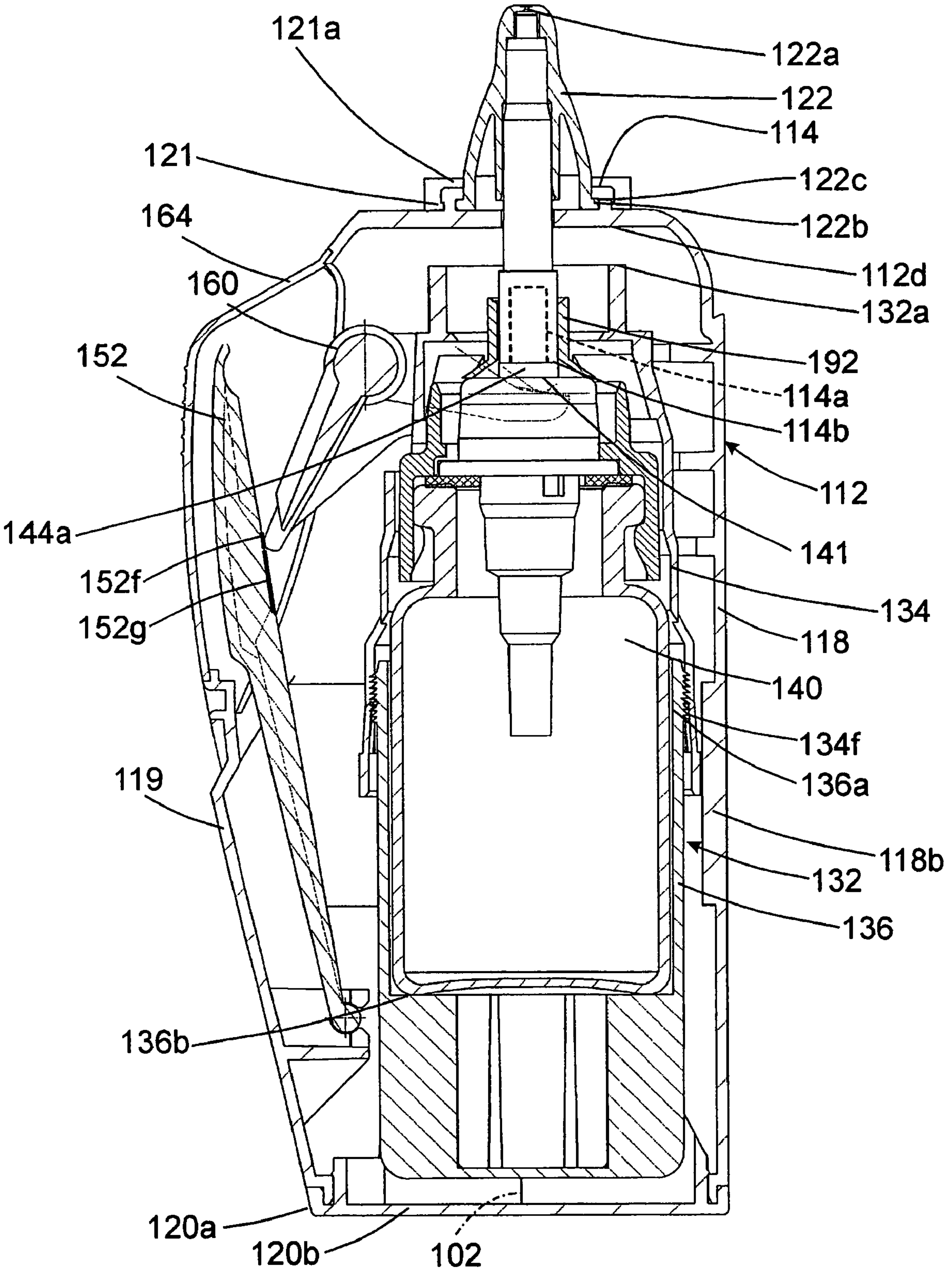
FIGS. 9 to 14 show a second embodiment of a discharge device according to the invention, where.

The second main difference concerns the presence of a centering cone 192. The centering cone 192 is pushed onto the lower end of the filler piece 114 before and during the fitting of the support 130 into the housing 112. This state is shown in FIG. 9. Upon axial insertion of the support 132 into the housing 112, the discharge tube 144*a* of the pump dispenser 140 is trapped by means of the cone 192, thus permitting simple insertion into a receiving recess 114*a* of the filler piece 114. As soon as the discharge tube 144*a* is arranged in the receiving recess 114*a* and the support 132 is pushed further into the housing 112, a cover 141 of the pump dispenser 140 itself comes into contact with the centering cone 192 and pushes the latter upward in the direction of the discharge opening 122*a* during the course of the further pushing-in of the pump dispenser and of the support on the filler piece 114. The end position of the centering cone 192 is reached when an upper end 132*a* of the support 132 comes up against a second abutment 112*d* provided on the housing. The centering cone thus arrives in an area where it does not interfere with the further operation of the discharge device.

This end position of the centering cone 192 can be seen in FIG. 10. Since the end position of the support 132 during assembly also corresponds to the end position of the support 132 during actuation, shown in FIG. 11, the centering cone 192 has no influence on the actuation during operation.

The third important difference between the second embodiment of a discharge device according to the invention in FIGS. 9 to 11 and the first embodiment in FIGS. 1 to 8 lies in the design and mounting of the discharge handle 152 and in the presence of the transmission lever 160. Whereas in the first embodiment in FIGS. 1 to 8 there is a substantially linear relationship between the excursion of the discharge handle 52 and the corresponding excursion of the support 32, a more complex actuation mechanism is provided in the actuation mechanism of the second embodiment in FIGS. 9 to 11. It comprises the actuation lever 152, the transmission lever 160 and the support 132. As FIGS. 10 and 11 show, the transmission lever 160 can also be pivoted indirectly by pressing the actuation lever 152 in, the sense of rotation of the two lever movements being in mutually opposite directions. This design with two levers easily permits nonlinear transmission ratios. In the specific design of the second illustrative embodiment, this has the effect that, at the start of the actuation of the actuation lever 152, a pivoting about a defined angle in respect of the actuation lever 152 causes a comparatively great pivoting of the transmission lever 160. Toward the end of the actuation movement, the transmission lever 160, during pivoting of the actuation lever 152 about the same angle, executes a greatly reduced pivoting movement. The result is that the force that a user has to apply in order to actuate the discharge device of FIGS. 9 to 11 is greater at the start than toward the end. The increased force applied at the start has the effect of reducing the danger of the user reducing the force to zero in the course of the discharge procedure and thus leaving the discharge procedure incomplete. To further increase the force that has to be applied at the start, the surface portion 152*f* of the actuation lever 152 at which the contact point with the transmission lever 160 is located at the start of the discharge procedure can be configured differently than a surface area 152*g* at which the contact point is located in the subsequent course of the discharge procedure. Thus, it is advisable that, in the area 152*f*, the surface should be configured, for example in terms of its roughness or also its shape, such that a high coefficient of static friction with the transmission lever 160 is recommended. By contrast, in the area 152*g*, there should be a low coefficient of kinetic friction, such that only small friction losses oppose a continuation of the movement.

The design with two levers, an actuation lever 152 and a transmission lever 160, has further advantages too. Thus, the use of two levers 152, 160 makes it possible to provide the pivot axis of the actuation lever 152 at that end of the discharge device directed away from the discharge opening 122*a*. This is advantageous, since it allows the actuation lever 152 to be actuated with a thumb, the thumb and the actuation lever 152 lying approximately parallel to each other across the complete actuation procedure. The force applied by the thumb can thus be applied over the complete length of the lever 152. This is of advantage from ergonomic aspects.

Figure 13:
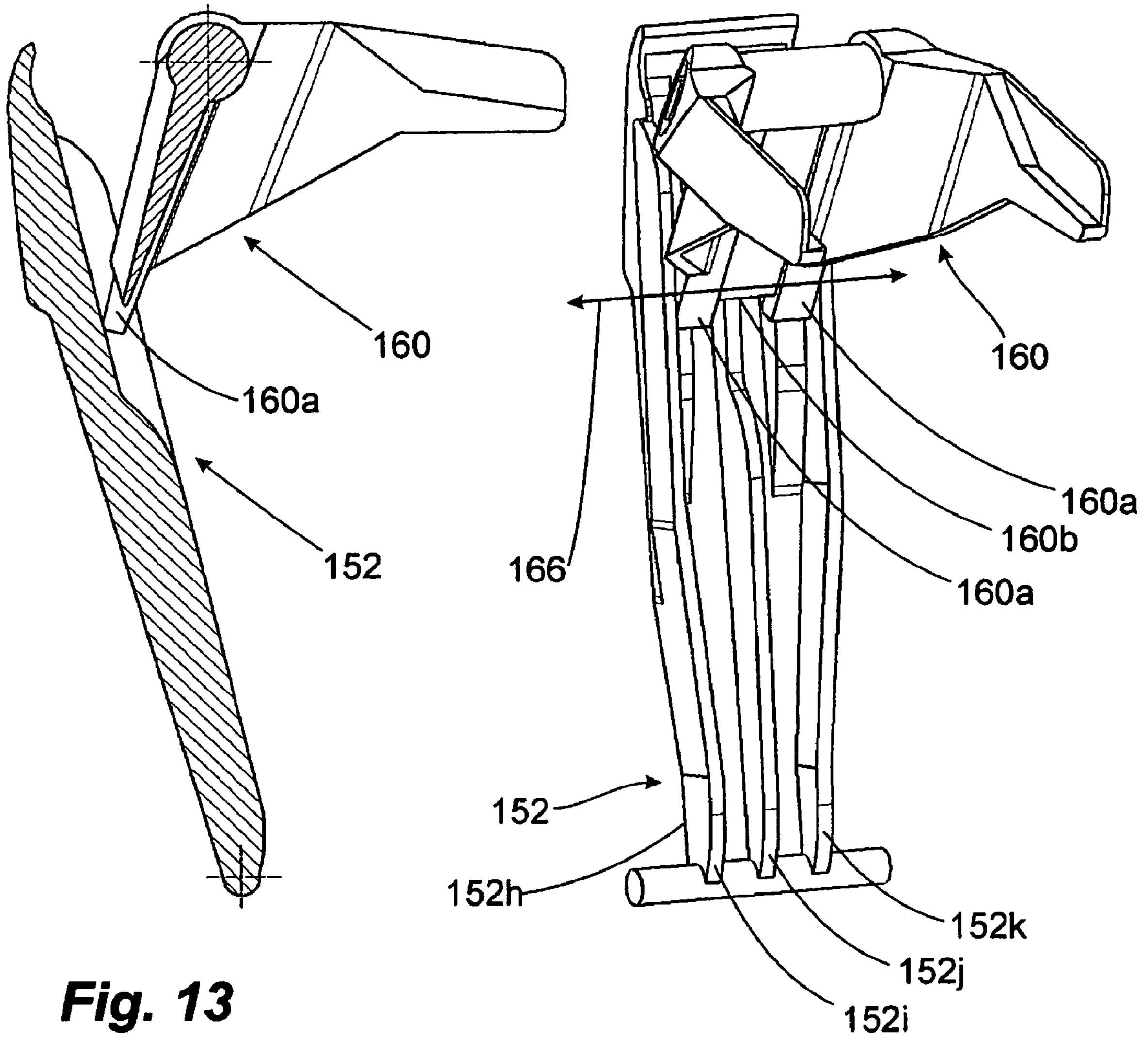

The actuation lever 152 and the transmission lever 160 are also shown in two perspectives in FIG. 13. It will be seen that the actuation lever 152 has an outer surface 152*h* and, adjoining the latter, three inwardly directed ribs 152*i*, 152*j*, 152*k*. This design affords a high level of stability for use of a small amount of material. A recess 160*b*, corresponding to the middle rib 152*j*, is provided between two contact tongues 160*a* on the transmission lever 160. The contact tongues 160 engage in the gaps between the ribs 152*h*, 152*i*, 152*j*, while at the same time the middle rib 152*i* engages in the recess 160*b*. In this way, a form-fit connection is created in a direction transverse to the actuation direction. There is therefore no danger of the actuation lever 152 sliding off from the transmission lever 160 in this direction 166.

To provide protection against contamination, an elastic membrane 164, deformable during the course of the actuation, is provided over the discharge handle 152. The elastic membrane is a very advantageous way of creating a seal on the discharge handle that permits particularly small discharge devices, since there is then no need for the discharge handle to be sealed by providing it with sealing side surfaces which, during actuation, penetrate into the housing and take up space there.

The invention claimed is:

1. A discharge device for media, comprising:

an outer housing with a discharge opening;

a discharge handle for manual actuation of the discharge device;

a support arranged in the outer housing, the support being movable along a main axis relative to the outer housing and being operatively connected axially to the discharge handle, the support having a seat for a pump dispenser, a first abutment provided on the outer housing and at least one functional portion, the pump dispenser having a pump that can be actuated by compression of the pump dispenser along the main axis, the first abutment being intended for interaction with the pump dispenser for the purpose of actuating the pump; and adjusting means provided between the discharge handle and the functional portion of the support, the adjusting means adjusting the position of the functional portion relative to the first abutment on the outer housing for a defined setting of the discharge handle, wherein the functional portion, during a discharge procedure, acts on the pump dispenser with a force oriented in a direction of the first abutment on the outer housing, and the adjusting means can be adjusted axially in a stepped manner.

2. The discharge device according to claim 1, wherein the support has at least two support portions including a first support portion that is forcibly guided by the discharge handle at least during an actuation of the discharge handle, and a second support portion that includes the functional portion of the support, the position of the first and the second support portions relative to each other being adjusted with the aid of the adjusting means.

3. The discharge device according to claim 2, wherein a second abutment is provided on the outer housing and is intended for interaction with the discharge handle or the first support portion.

4. The discharge device according to claim 2, wherein the adjusting means comprises locking means which are designed for locked connections in a plurality of different locking positions, said locking positions differing from one another in terms of an axial position of the functional portion relative to the discharge handle or the first support portion.

5. The discharge device according to claim 4, wherein the locking means comprises several subsidiary locking means whose respective locking positions differ at least partially from one another.

6. The discharge device according to claim 4, wherein the locking means comprises at least one locking ladder and locking lugs that lie opposite locking ladder and are designed to interact with the locking ladder.

7. The discharge device according to claim 1, wherein the functional portion is arranged such that the force is introduced through the functional portion onto that side of the pump dispenser directed away from the first abutment on the housing.

8. The discharge device according to claim 1, wherein the adjusting means can be adjusted axially in a stepped manner in step sizes smaller than 1 mm.

9. The discharge device according to claim 8, wherein the adjusting means can be adjusted axially in a stepped manner in step sizes smaller than 0.6 mm.

10. The discharge device according to claim 9, wherein the adjusting means can be adjusted axially in a stepped manner in step sizes smaller than 0.3 mm.

11. A discharge device for media, comprising:

an outer housing with a discharge opening;

a discharge handle for manual actuation of the discharge device;

a support arranged in the outer housing, the support being movable along a main axis relative to the outer housing and being operatively connected axially to the discharge handle, the support having a seat for a pump dispenser, a first abutment provided on the outer housing and at least one functional portion, the pump dispenser having a pump that can be actuated by compression of the pump dispenser along the main axis, the first abutment being intended for interaction with the pump dispenser for the purpose of actuating the pump; and adjusting means provided between the discharge handle and the functional portion of the support, the adjusting means adjusting the position of the functional portion relative to the first abutment on the outer housing for a defined setting of the discharge handle, wherein the functional portion, during a discharge procedure, acts on the pump dispenser with a force oriented in a direction of the first abutment on the outer housing, and the support, on a side directed toward the first abutment on the outer housing, has a funnel-shaped centering aid and/or a guide aid for connecting to a discharge channel on the outer housing.

12. A discharge device for media, comprising:

an outer housing with a discharge opening;

a discharge handle for manual actuation of the discharge device; and a support arranged in the outer housing, the support being movable along a main axis relative to the outer housing and being operatively connected axially to the discharge handle, the support having a seat for a pump dispenser and having a first abutment provided on the outer housing, the pump dispenser having a pump that can be actuated by compression of the pump dispenser along the main axis, the first abutment being intended for interaction with the pump dispenser for the purpose of actuating the pump, wherein the discharge device can be switched between an activated operating state in which an actuation of the discharge handle causes a translation of the support and a deactivated operating state in which an actuation of the discharge handle is blocked or the discharge handle is uncoupled from the support, and the operating state can be controlled by a rotation movement of the support about the main axis, an axial operative connection between the support and the discharge handle being present in at least a first angle portion and being interrupted in at least a second angle portion.

13. The discharge device according to claim 12, wherein in a third angle portion, there is an axial blocked connection between the support and the discharge handle, by which the discharge handle is held in a blocked position.

14. The discharge device according to claim 12, further comprising a protective cap which, in a functional state, prevents the transfer of the discharge device to the activated operating state.

15. The discharge device of claim 12, wherein the support has at least one functional portion which, during a discharge procedure, acts on the pump dispenser with a force oriented in the direction of the first abutment on the outer housing, and the discharge device comprises adjusting means between the discharge handle and the functional portion of the support, the adjusting means adjusting the position of the functional portion relative to the first abutment on the outer housing for a defined setting of the discharge handle.

16. A discharge device for media, comprising:

an outer housing with a discharge opening;

a discharge handle for manual actuation of the discharge device; and a support arranged in the outer housing, the support being movable along a main axis relative to the outer housing and being operatively connected axially to the discharge handle, the support having a seat for a pump dispenser, a first abutment provided on the outer housing and an operative connection portion for interacting with the discharge handle, the pump dispenser having a pump that can be actuated by compression of the pump dispenser along the main axis, the first abutment being intended for interaction with the pump dispenser for the purpose of actuating the pump, the operative connection portion having at least one radially extending recess, wherein the discharge device can be switched between an activated operating state in which an actuation of the discharge handle causes a translation of the support and a deactivated operating state in which the actuation of the discharge handle is blocked or the discharge handle is uncoupled from the support, and, in the activated operating state, at least one guide extension connected to the discharge handle protrudes into the radially extending recess.

17. The discharge device according to claim 16, wherein the operative connection portion has an at least partially cylindrical shape extending in a direction of the main axis, and the recess is designed as a control cam that extends on a circumferential surface of the operative connection portion.

18. The discharge device according to claim 17, wherein the control cam has, in a first angle portion, a first control cam portion which extends on the circumferential surface of the operative connection portion in a plane orthogonal to the main axis and/or, in a second angle portion, a second control cam portion which extends on the circumferential surface of the operative connection portion axially with respect to the main axis and circumferentially with respect to the circumferential surface of the operative connection portion and/or, in a third angle portion, a third control cam portion which extends on the circumferential surface of the operative connection portion in the plane orthogonal to the main axis.

19. The discharge device of claim 16, wherein the support has at least one functional portion which, during a discharge procedure, acts on the pump dispenser with a force oriented in the direction of the first abutment on the outer housing, and the discharge device comprises adjusting means between the discharge handle and the functional portion of the support, the adjusting means adjusting the position of the functional portion relative to the first abutment on the outer housing for a defined setting of the discharge handle.

20. A discharge device for media, comprising:

an outer housing with a discharge opening;

a discharge handle for manual actuation of the discharge device; and a support arranged in the outer housing, the support being movable along a main axis relative to the outer housing and being operatively connected axially to the discharge handle, the support having a seat for a pump dispenser and having a first abutment provided on the outer housing, the pump dispenser having a pump that can be actuated by compression of the pump dispenser along the main axis, the first abutment being intended for interaction with the pump dispenser for the purpose of actuating the pump, wherein the discharge device can be switched between an activated operating state in which an actuation of the discharge handle causes a translation of the support and a deactivated operating state in which the actuation of the discharge handle is blocked or the discharge handle is uncoupled from the support, and the discharge device can be switched between the activated operating state and the deactivated operating state by means of an activation handle.

21. The discharge device according to claim 20, wherein the discharge handle, in the deactivated operating state, is arranged in a space-saving stowage position.

22. The discharge device according to claim 21, wherein the discharge handle, in the activated operating state, cannot be moved into the stowage position.

23. The discharge device according to claim 20, wherein the activation handle is designed to be rotatable, and is operatively connected with rotational coupling to the support.

24. The discharge device according to claim 23, wherein the activation handle is connected to the support by means of a slip clutch.

25. The discharge device according to claim 24, wherein the slip clutch has a toothing with teeth that are at least partially elastically deformable such that the teeth disengage when a defined resistance torque is overcome.

26. The discharge device according to claim 20, wherein the activation handle is designed as a portion of the outer housing as a rotatable base portion of the outer housing.

27. The discharge device of claim 20, wherein the support has at least one functional portion which, during a discharge procedure, acts on the pump dispenser with a force oriented in the direction of the first abutment on the outer housing, and the discharge device comprises adjusting means between the discharge handle and the functional portion of the support, the adjusting means adjusting the position of the functional portion relative to the first abutment on the outer housing for a defined setting of the discharge handle.

* * * * *